United States Patent
Kishigami et al.

(10) Patent No.: US 10,073,170 B2
(45) Date of Patent: Sep. 11, 2018

(54) RADAR APPARATUS

(71) Applicant: Panasonic Corporation, Osaka (JP)

(72) Inventors: Takaaki Kishigami, Tokyo (JP); Noriaki Takeda, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 317 days.

(21) Appl. No.: 15/045,338

(22) Filed: Feb. 17, 2016

(65) Prior Publication Data

US 2016/0259042 A1    Sep. 8, 2016

(30) Foreign Application Priority Data

Mar. 3, 2015  (JP) .................................. 2015-041475

(51) Int. Cl.
*G01S 13/28*    (2006.01)
*G01S 7/03*    (2006.01)
(Continued)

(52) U.S. Cl.
CPC ............ *G01S 13/284* (2013.01); *G01S 7/038* (2013.01); *G01S 7/288* (2013.01); *G01S 13/106* (2013.01);
(Continued)

(58) Field of Classification Search
CPC ...... G01S 13/931; G01S 13/284; G01S 7/038; G01S 7/288; G01S 13/106; G01S 13/288; G01S 2007/2886
See application file for complete search history.

(56) References Cited

U.S. PATENT DOCUMENTS 4,513,288 A * 4/1985 Weathers ............... G01S 13/288
                                                      342/189
5,056,106 A * 10/1991 Wang ..................... A63B 57/00
                                                      342/450
(Continued)

FOREIGN PATENT DOCUMENTS

JP        2002-214331        7/2002

OTHER PUBLICATIONS

Spanno, E., O. Ghebrebrhan, "Sequences of Complimentary Codes for the Optimum Decoding of Truncated Ranges and High Sidelobe Suppression Factors for ST/MST Radar Systems", IEEE Transactions on Geoscience and Remote Sensing, vol. 34, No. 2 , Mar. 1996, pp. 330-345 (Year: 1996).*

(Continued)

*Primary Examiner* — Peter M Bythrow
(74) *Attorney, Agent, or Firm* — Seed IP Law Group LLP

(57) ABSTRACT

A radar apparatus includes: a transmitter which, in operation, transmits, as radar transmission signals, code sequences including a plurality of complementary codes having a code length L in each transmission period; a receiver which, in operation, receives one or more reflected waves including the radar transmission signals reflected by an object and are analog signals; an A/D converter which, in operation, converts the one or more reflected signals into digital signals, which are discrete samples; and a calculator which, in operation, performs a first calculation of correlation between the discrete samples and the code sequence transmitted by the transmitter and a second calculation of correlation between the discrete samples and a partial code sequence obtained by extracting a code length L−Q (L>Q≥2) from a tail end of the code sequence transmitted by the transmitter, and that outputs one of a result of the first (Continued)

correlation calculation and a result of the second correlation calculation.

8 Claims, 11 Drawing Sheets

(51) Int. Cl.
  *G01S 7/288* (2006.01)
  *G01S 13/10* (2006.01)
(52) U.S. Cl.
  CPC ..... *G01S 13/288* (2013.01); *G01S 2007/2886* (2013.01)

(56) References Cited

U.S. PATENT DOCUMENTS

| | | | | |
|---|---|---|---|---|
| 5,917,866 | A | * | 6/1999 | Pon .................... G01S 19/22 375/148 |
| 5,974,087 | A | * | 10/1999 | Nowara ................ H04B 17/16 375/130 |
| 6,385,232 | B1 | * | 5/2002 | Terashima ........... H04B 1/7075 370/515 |
| 6,442,154 | B1 | * | 8/2002 | Bottomley ......... H04B 1/71072 370/335 |
| 2009/0135053 | A1 | * | 5/2009 | Negoro ................ H04B 1/707 342/195 |
| 2013/0176166 | A1 | * | 7/2013 | Kishigami ............. G01S 7/023 342/202 |
| 2014/0085127 | A1 | * | 3/2014 | Kishigami ............. G01S 13/91 342/108 |
| 2015/0168540 | A1 | * | 6/2015 | Morita ................ G01S 7/2813 342/21 |
| 2015/0247924 | A1 | * | 9/2015 | Kishigami ........... G01S 13/931 342/70 |
| 2017/0299711 | A1 | * | 10/2017 | Kishigami ........... G01S 13/581 |

OTHER PUBLICATIONS

S. Z. Budisin "New complementary pairs of sequences" Electronics Letters, vol. 26, No. 13, pp. 881-883, Jun. 1990.

Eric Spano et al., "Sequences of complementary codes for the optimum decoding of truncated ranges and high sidelobe suppression factors for ST/MST radar systems" IEEE Transactions on Geoscience and Remote Sensing, vol. 34, No. 2, pp. 330-345, 1996.

* cited by examiner

RADAR APPARATUS

BACKGROUND

1. Technical Field

The present disclosure relates to a radar apparatus.

2. Description of the Related Art

In recent years, a study has been conducted on high-resolution radars using microwaves or millimeter waves. Also, in order to improve outdoor safety, there are demands for development of wide-angle radars that can sense not only vehicles but also pedestrians.

Wide-angle pulse radars for sensing vehicles and pedestrians receive signals in which reflected waves from short-distance targets (e.g., vehicles) and reflected waves from long-distance targets (e.g., people) are mixed. Thus, the wide-angle pulse radars require radar transmitters that transmit pulse waves or modulated pulse waves having a low range sidelobe characteristic. The wide-angle pulse radars further require radar receivers having a wide reception dynamic range.

For wide-angle pulse radars of related art, pulse compression radars have been proposed that use Barker codes, M-sequence codes, or complementary codes as pulse waves or modulated pulse waves. A complementary-code generating method is disclosed in Budisin, S. Z. "New complementary pairs of sequences", Electronics Letters, 1990, 26, (13), pp. 881-883.

Complementary codes are generated, for example, in the following manner. That is, complementary codes having a code length L=4, 8, 16, 32, ..., $2^P$ are sequentially generated based on a code sequence a=[1 1] and a code sequence b=[1 −1] including elements 1 or −1 and having complementarity. With wide-angle pulse radars using general pulse codes, the required reception dynamic range increases as the code length increases, but with wide-angle pulse radars using complementary codes, the peak sidelobe ratio (PSR) can be reduced with a smaller code length.

Thus, with such known wide-angle pulse radars, even when a reflected wave from a target (or an object) at a short distance and a reflected wave from a target (or an object) at a long distance are mixed, it is possible to reduce the dynamic range required for the reception. However, when the known wide-angle pulse radars use M-sequence codes, the PSR becomes 20 log (1/L), and thus codes having a code length L (e.g., L=1024 for PSR=60 dB) that is larger than that of complementary codes are needed in order to obtain low range sidelobes.

For wide-angle pulse radars of related art, there have been proposed codes (hereinafter referred to as "Spano codes") obtained by contriving the arrangement order of complementary codes in a segment in which a reflected wave from a target is received during transmission of pulse codes (hereinafter referred to as a "code transmission segment") (see Spano, E. and O. Ghebrebrhan "Sequences of complementary codes for the optimum decoding of truncated ranges and high sidelobe suppression factors for ST/MST radar systems", IEEE Transactions on Geoscience and Remote Sensing Vol. 34, pp. 330-345, 1996). Also, a radar apparatus using Spano codes is disclosed in Japanese Unexamined Patent Application Publication No. 2002-214331.

However, with the known radar apparatus of the related art, when isolation between a transmitting antenna and a receiving antenna is insufficient, signal components of transmission signals which leak to the receiving antenna (i.e., transmission leakage signals) increase in a time segment (a code transmission segment) in which pulse codes are transmitted from the transmitting antenna. In addition, when a target having a large RCS (Radar Cross Section) (a large-RCS object, typified by a vehicle) exists at a distance close to the radar apparatus of the related art, the signal components reflected from the large RCS object increase.

In those cases, in the radar apparatus of the related art, when the amplitude of reception baseband signals output from a reception radio-frequency (RF) circuit exceeds the dynamic range of an analog-to-digital (A/D) converter, nonlinear distortion due to clipping occurs. Also, in the radar apparatus of the related art, when an input to a low-noise amplifier (LNA) in the reception RF circuit reaches an input level in a saturation region, nonlinear distortion occurs.

When nonlinear distortion components are generated in the radar apparatus of the related art, the range sidelobes increase owing to influences of the nonlinear distortion components in a time segment corresponding to a pulse code width of a reflected wave or transmission leakage signals from a large RCS object at a timing at which the reflected wave or the transmission leakage signals arrive(s). Thus, the radar apparatus of the related art has a possibility that the performance of detecting a reflected wave from a low-RCS object deteriorates in that time segment.

SUMMARY

One non-limiting and exemplary embodiment provides a radar apparatus that improves the performance of detecting a target at a close distance or in a code transmission segment.

A radar apparatus according to one aspect of the present disclosure includes: a transmitter which, in operation, transmits, as radar transmission signals, code sequences including a plurality of complementary codes having a code length L in each transmission period; a receiver which, in operation, receives one or more reflected waves including the radar transmission signals reflected by an object and are analog signals; an analog-to-digital (A/D) converter which, in operation, converts the one or more reflected signals into digital signals, which are discrete samples; and a calculator which, in operation, performs a first calculation of correlation between the discrete samples and the code sequence transmitted by the transmitter and a second calculation of correlation between the discrete samples and a partial code sequence obtained by extracting a code length L−Q (L>Q≥2) from a tail end of the code sequence transmitted by the transmitter, and that outputs one of a result of the first correlation calculation and a result of the second correlation calculation.

According to the present disclosure, it is possible to improve the performance of detecting a target at a near distance or in a code transmission segment.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
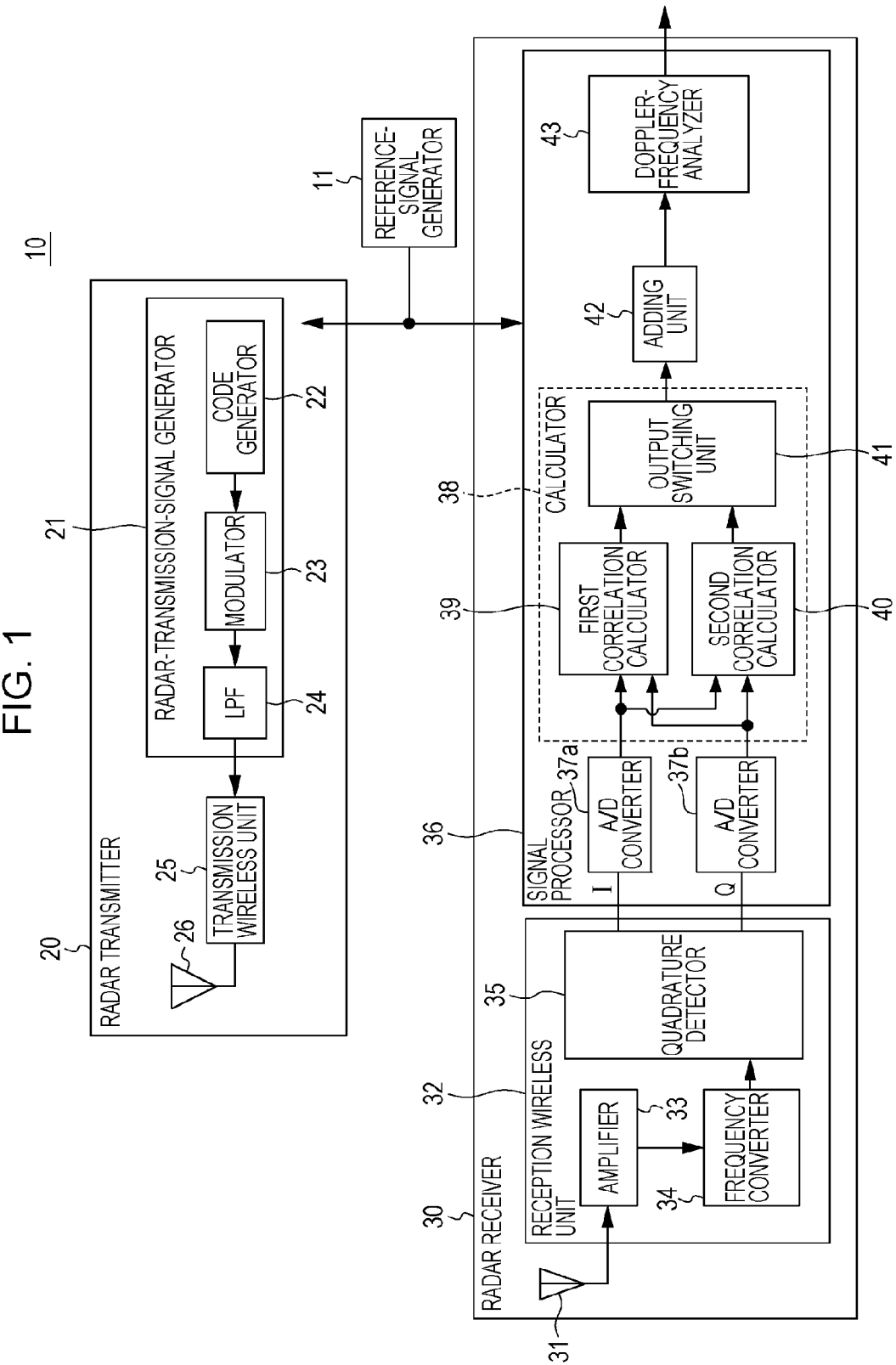
FIG. 1 is a block diagram illustrating the configuration of a radar apparatus according to a first embodiment of the present disclosure.

Embodiments of the present disclosure will be described below in detail with reference to the accompanying drawings. In the embodiments, elements having the same or similar functions are denoted by the same reference numeral, and redundant descriptions are not given hereinafter.

First Embodiment

FIG. 1 is a block diagram illustrating the configuration of a radar apparatus 10 according to a first embodiment of the present disclosure. The radar apparatus 10 includes a radar transmitter 20, a radar receiver 30, and a reference-signal generator 11.

First, a description will be given of the configuration of the radar transmitter 20.

The radar transmitter 20 includes a radar-transmission-signal generator 21, a transmission wireless unit 25, and a transmitting antenna 26. The radar-transmission-signal generator 21 includes a code generator 22, a modulator 23, and a band-limiting filter 24 (hereinafter referred to as a "low-pass filter (LPF)" and illustrated as "LPF" in FIG. 1). The radar-transmission-signal generator 21 generates a timing clock obtained by multiplying a reference signal from the reference-signal generator 11 by a predetermined factor, and repeatedly outputs a baseband radar transmission signal r(n, M)=I(n, M)+jQ(n, M) in each predetermined radar transmission period Tr, based on the timing clock. In this case, j represents an imaginary unit, n represents a discrete time, and M represents the ordinal number of the radar transmission period.

The code generator 22 generates codes in a Spano code sequence having a code length L in each predetermined radar transmission period Tr and outputs the generated codes to the modulator 23. In this case, a pulse compression code in the M-th radar transmission period is represented by $a(M)_n$, where $n=1, \ldots, L$. That is, for the code length L, the code generator 22 generates a code sequence $A(M) = \{a(M)_1, a(M)_2, \ldots, a(M)_L\}$ having any elements of L pieces of 1, −1, j, and −j, where j represents an imaginary unit. Also, when a Spano code sequence has the code length L, codes are repeated at 2L cycles. That is, the code generator 22 repeatedly generates a code set, each including code sequences A(1) to A(2L).

A description below will be given of examples of Spano code sequences for the code length L=4 and 8, the Spano code sequences being generated by the code generator 22.

For L=4, the code generator 22 generates a code sequence given by:

$$A, B, \overline{B}', \overline{A}', B, A, \overline{A}', \overline{B}' \quad (1)$$

In this case, code sequences A and B are complementary codes having a code length L=4 and are a pair of code sequences. When a sidelobe that appears owing to autocorrelation of code sequence A and a sidelobe that appears owing to autocorrelation of code sequence B have a relationship of cancelling each other out, code sequences A and B are defined as a pair of code sequences. Code sequence A' is a sequence having inverted codes of code sequence A, the overline "¯" denotes a code sequence in which all logics are inverted (when the sum of elements is not zero, is used).

For L=8, the code generator 22 generates a code sequence given by:

$$A, B, \overline{B}', \overline{A}', B, A, \overline{A}', \overline{B}' \\ C, D, \overline{D}', \overline{C}', D, C, \overline{C}', \overline{D}' \quad (2)$$

Code sequences A and B are a pair of complementary codes having a code length of 8, and code sequences C and D are a pair of complementary codes having a code length of 8.

Now, a description will be given of an autocorrelation characteristic of Spano codes used by the radar apparatus 10. A Spano code sequence transmitted by the radar transmitter 20 is a pulse code sequence A(m) having a code length L and is represented by $A(m) = \{a(m)_1, a(m)_2, \ldots, a(m)_L\}$.

A code sequence $\{a(m)_{S1}, \ldots, a(m)_{S2}\}$ obtained by extracting partial ($S_2-S_1+1$) codes, that is, the $S_1$th code to the $S_2$th code, from the pulse code sequence A(m) is used to calculate a correlation result $R_{S1:S2}(\tau, A(m))$. The lag $\tau$ represents a delay during correlation calculation.

An addition correlation result $RS_{S1:S2}(\tau, A(1), A(2L))$ is a value obtained by adding the correlation result $R_{S1:S2}(\tau, A(m))$ of expression (3) to 2L Spano code sequences A(1), ..., and A(2L).

As represented in expression (5), when the lag $\tau=0$, the addition correlation result $RS_{S1:S2}(\tau, A(1), A(2L))$ of expression (4) is a positive value $(2L \times (S_2-S_1+1))$, and when the lag $\tau \neq 0$, the addition correlation result $RS_{S1:S2}(\tau, A(1), A(2L))$ of expression (4) is 0 (where $S_2-S_1+1 \geq 2$ and $S_2 > S_1$), and thus the codes have the characteristic of the sidelobes becoming zero.

$$R_{S_1:S_2}(\tau, A(m)) = \sum_{n=S_1}^{S_2} a(m)_{n+\tau} a(m)_n^* \quad (3)$$

$$RS_{S_1:S_2}(\tau, A(1), A(2L)) = \sum_{m=1}^{2L} \sum_{n=S_1}^{S_2} a(m)_{n+\tau} a(m)_n^* \quad (4)$$

$$\begin{cases} RS_{S_1:S_2}(\tau, A(1), A(2L)) \neq 0, & \text{when } \tau = 0 \\ RS_{S_1:S_2}(\tau, A(1), A(2L)) = 0, & \text{when } \tau \neq 0 \end{cases} \quad (5)$$

In the following description in the present embodiment, a Spano code sequence is used as codes that provide a characteristic in which the sidelobes become zero even when correlation processing is performed using partial codes shorter than transmission codes. However, the codes in the present embodiment are not limited to Spano codes and may be implemented by another code sequence having the above-described characteristic.

The modulator 23 performs pulse modulation (amplitude modulation, amplitude-shift keying (ASK), pulse-shift keying) or phase modulation (phase-shift keying (PSK)) on a code sequence output from the code generator 22 and outputs modulated signals to the LPF 24.

The LPF 24 limits the modulated signals, output from the modulator 23, to a predetermined band and outputs band-limited baseband radar transmission signals to the transmission wireless unit 25.

The transmission wireless unit 25 converts the frequency of the baseband radar transmission signals, output from the radar-transmission-signal generator 21, into a carrier frequency (radio frequency (RF)) band. The transmission wireless unit 25 uses a transmission amplifier to amplify the radar transmission signals in the carrier frequency band to a predetermined transmit power P [dB] and outputs the amplified radar transmission signals to the transmitting antenna 26.

The transmitting antenna 26 radiates the radar transmission signals, output from the transmission wireless unit 25, into space.

Figure 2:
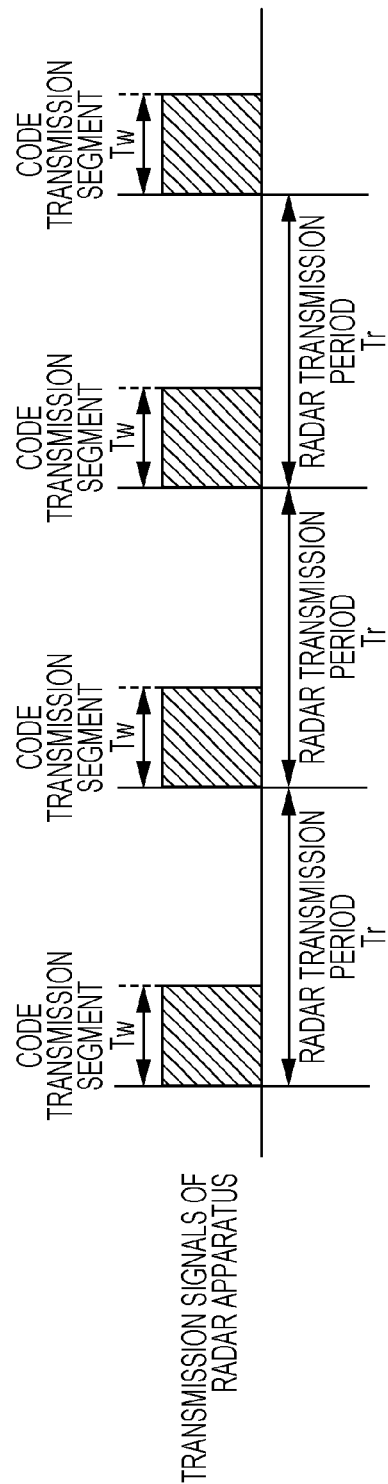
FIG. 2 illustrates a radar transmission signal transmitted in each radar transmission period.

FIG. 2 illustrates radar transmission signals transmitted in each radar transmission period. Radar transmission signals are transmitted in each code transmission segment Tw in a radar transmission period Tr, and a (Tr−Tw) segment is a signal-less segment. A pulse code sequence having a pulse code length L is included in each code transmission segment Tw, and modulation using No samples is performed for each pulse code, so that signals of Nr (=No×L) samples are included in the code transmission segment Tw. Nu samples are included in the signal-less segment (Tr−Tw) in each radar transmission period.

Next, a description will be given of the configuration of the radar receiver 30.

The radar receiver 30 includes a receiving antenna 31, a reception wireless unit 32, and a signal processor 36.

The receiving antenna 31 receives signals (a reflected wave) that are radar transmission signals transmitted from the radar transmitter 20 and reflected by objects including a target. The radar reception signals (the reflected wave) received by the receiving antenna 31 are output to the reception wireless unit 32.

The reception wireless unit 32 includes an amplifier 33, a frequency converter 34, and a quadrature detector 35.

The amplifier 33 performs signal amplification on the radar reception signals received by the receiving antenna 31 and outputs high-frequency radar reception signals to the frequency converter 34.

The frequency converter 34 converts the high frequency radar reception signals, output from the amplifier 33, into baseband signals and outputs the baseband signals to the quadrature detector 35.

The quadrature detector 35 performs quadrature detection on the baseband signals output from the frequency converter 34 to convert the baseband signals into I signals and Q signals included in the baseband signals. The I signals are output to an A/D converter 37a in the signal processor 36, and the Q signals are output to an A/D converter 37b in the signal processor 36. As in the reference-signal generator 11, a timing clock signal in the signal processor 36 with respect to the I signals and the Q signals included in the baseband signals is generated as a timing clock obtained by multiplying a reference signal from the radar-transmission-signal generator 21 by a predetermined factor.

The signal processor 36 includes the A/D converters 37a and 37b, a calculator 38, an adding unit 42, and a Doppler-frequency analyzer 43.

The A/D converters 37a and 37b sample the I signals and Q signals, included in the baseband signals output from the quadrature detector 35, at a discrete time point and converts the I signals and Q signals into digital data, respectively. The A/D converters 37a and 37b output the converted digital data to the calculator 38. In this case, the A/D converters 37a and 37b obtain Ns discrete samples per pulse time Tp (=Tw/L) for the radar transmission signals. That is, the sampling rate is Ns/Tp.

Hereinafter, the I signal and the Q signal at a discrete time k in the M-th radar transmission period, the I signal and the Q signal being sampled by the A/D converters 37a and 37b, are represented as a baseband signal Ir(k, M) and a baseband signal Qr(k, M), respectively. The baseband signals Ir(k, M) and Qr(k, M) are used to represent complex-number discrete samples x(k, M)=Ir(k, M)+jQr(k, M), where j is an imaginary unit. The discrete times k as used hereinafter have a reference (k=1) at a timing at which a radar transmission period Tr is started and means that measurement up to k=(Nr+Nu)Ns/No, which is a sampling point before the radar transmission period Tr ends, is periodically performed. That is, k is 1, . . . , and (Nr+Nu)Ns/No.

The calculator 38 includes a first correlation calculator 39, a second correlation calculator 40, and an output switching unit 41.

The first correlation calculator 39 performs calculation of correlation between the discrete samples x(k, M) output from the A/D converters 37a and 37b in each radar transmission period Tr and pulse compression codes A(M) of the code length L to be transmitted and outputs a calculation result to the output switching unit 41. Sliding correlation calculation in the M-th radar transmission period is performed, for example, based on:

$$AC(k, M) = \sum_{n=1}^{L} x(k + N_s(n-1), M)a(M)_n^* \tag{6}$$

In expression (6), AC(k, M) represents a correlation calculation value at a discrete time k in the M-th radar transmission period. The asterisk (*) represents a complex conjugate operator. AC(k, M) is a result obtained by performing calculation over the period of k=U+1, (Nr+Nu)Ns/No.

The second correlation calculator 40 performs calculation of correlation between the discrete samples x(k, M) output from the A/D converters 37a and 37b in each radar transmission period Tr and partial codes $A_{[L-Q+1:L]}(M) = \{a(M)_{L-Q+1}, a(M)_{L-Q+2}, a(M)_L\}$ obtained by extracting Q codes from the tail end of the pulse compression codes A(M) of the code length L to be transmitted, and outputs a calculation result to the output switching unit 41. In this case, L>Q≥2.

The sliding correlation calculation in the M-th radar transmission period is performed, for example, based on:

$$AC_{subcode}(k, M) = \sum_{n=1}^{Q} x(k + N_s(n-1+L-Q), M)a(M)_{L-Q+n}^* \tag{7}$$

In expression (7), $AC_{subcode}(k, M)$ represents a correlation calculation value at a discrete time k in the M-th radar transmission period. The asterisk (*) represents a complex conjugate operator. $AC_{subcode}(k, M)$ is calculated over the period of k=1, ..., U.

In order to achieve a noise level that is equivalent to that of outputs of the first correlation calculator 39, $AC_{subcode}(k, M)$ may be calculated using:

$$AC_{subcode}(k, M) = \frac{1}{\sqrt{Q/L}} \sum_{n=1}^{Q} x(k + N_s(n-1+L-Q), M)a(M)^*_{L-Q+n} \quad (8)$$

The output switching unit 41 performs switching so as to selectively connect to one of the first correlation calculator 39 and the second correlation calculator 40 according to the discrete times k and outputs the calculation result, output from the first correlation calculator 39 or the second correlation calculator 40, to the adding unit 42. That is, the output switching unit 41 outputs the calculation result $AC_{subcode}(k, M)$ of the second correlation calculator 40 in the period of the discrete time k=1, U and outputs the calculation result AC(k, M) of the first correlation calculator 39 in the period of the discrete time k=U+1, ..., (Nr+Nu)Ns/No.

In this case, when U=Ns×L is set, the output switching unit 41 connects to the first correlation calculator 39 after k=U+1, thereby allowing influences of signal components of transmission signals which leak to the receiving antenna 31 (such signal components may hereinafter be referred to as "transmission leakage signals") to be suppressed in a time segment (a code transmission segment) in which pulse codes are transmitted from the transmitting antenna 26. On the other hand, in the case of the discrete time k=1, ..., U, the output switching unit 41 connects to the second correlation calculator 40, thereby allowing influences of transmission leakage signals to be suppressed in a time segment (a code transmission segment) in which pulse codes are transmitted from the transmitting antenna 26 to be suppressed in the range of the discrete time k=Ns×Q+1, ..., U, although there are influences of the transmission leakage signals in the range of the discrete time k=1, Ns×Q in the time segment (the code transmission segment) in which the pulse codes are transmitted from the transmitting antenna 26.

On the basis of a correlation calculation value for each discrete time k, the correlation calculation value being the calculation result of the first correlation calculator 39 or the second correlation calculator 40 and being output from the output switching unit 41, the adding unit 42 performs addition (coherent integration) of the number of additions, Np, over a period (Tr×Np), which is multiple times "Nps" of the radar transmission period Tr, in accordance with:

$$CI(k, m) = \begin{cases} \sum_{g=1}^{Np} AC_{subcode}(k, Np(m-1)+g), & \text{when } k \leq U \\ \sum_{g=1}^{Np} AC(k, Np(m-1)+g), & \text{when } k > U \end{cases} \quad (9)$$

In expression (9), the number of additions, Np, is an integer greater than or equal to 2. That is, the adding unit 42 performs addition a plurality "Np" of times by using outputs of the calculator 38 that are obtained in each radar transmission period Tr as one unit. That is, when k≤U, the adding unit 42 calculates, for each discrete time k, a correlation value CI(k, m) obtained by performing addition with the timings of the discrete times k being aligned, by using $AC_{subcode}(k, Np(m-1)+1)$ to $AC_{subcode}(k, Np×m)$ as one unit.

When k>U, the adding unit 42 calculates, for each discrete time k, a correlation value CI(k, m) obtained by performing addition with the timings of the discrete times k being aligned, by using AC(k, Np(m-1)+1) to AC(k, Np×m) as one unit. In this case, m is a natural number and represents the m-th output in the adding unit 42.

Thus, in a time range in which the addition is performed the plurality "Np" of times, the radar receiver 30 can increase the signal-to-noise ratio (SNR) owing to the effect of the addition and can improve the measurement performance for estimating an arrival distance of a target in a range in which reception signals in a reflected wave from the target have a high correlation.

In order to obtain an ideal addition gain, the radar receiver 30 requires a condition that phase components match each other in a certain range in the addition segment, and thus sets the number of additions to be applied, based on the possible maximum movement speed of a target to be measured. As the possible maximum movement speed of the target increases, the time period in which the time correlations are high decreases owing to influences of changes in a Doppler frequency included in a reflected wave from a target. Thus, in the radar receiver 30, the number of additions, Np, takes a small value, and the gain-improvement effect due to the addition decreases.

The Doppler-frequency analyzer 43 corrects a phase change $\Phi(fs)=2\pi fs(Tr×Np) \Delta\Phi$ corresponding to 2Nf different Doppler frequencies $fs\Delta\Phi$ with the timings of the discrete times k being aligned, by using CI(k, Nc(w−1)+1) to CI(k, Nc×w), which are Nc outputs obtained from the adding unit 42 for respective discrete times k, as one unit, and then performs coherent integration in accordance with expression (10).

$$FT\_CI(k, fs, w) = \sum_{q=0}^{Nc-1} CI(k, Nc(w-1)+q+1)\exp[-j\phi(fs)q] \quad (10)$$

$$= \sum_{q=0}^{Nc-1} CI(k, Nc(w-1)+q+1)\exp$$

$$[-j2\pi fs(TrNp)\Delta\phi q]$$

In expression (10), FT_CI(k, fs, w) is the w-th output of the Doppler-frequency analyzer 43 and indicates a coherent integration result of a Doppler frequency $fs\Delta\Phi$ at a discrete time k. In this case, fs is −Nf+1, ..., 0, ..., and Nf, k is 1, ..., and (Nr+Nu)Ns/No, w is a natural number, and $\Delta\Phi$ is a unit of phase rotation. Thus, FT_CI(k, −Nf+1, w), ..., and FT_CI(k, Nf−1, w), which are coherent integration results corresponding to 2Nf Doppler frequency components for respective discrete times k are obtained in each period (Tr×Np×Nc), which is Np×Nc times of the radar transmission period Tr.

Based on the calculated w-th Doppler analysis result, the Doppler-frequency analyzer 43 outputs, as a result of radar positioning, the discrete time k and the Doppler frequency $fs\Delta\Phi$ with which a power value is larger than or equal to a predetermined value.

In this case, since the code sequences to be transmitted have the characteristics given by expressions (3), (4), and (5), the radar transmitter 20 needs to set the multiple times (Np×Nc) of the radar transmission period Tr to an integer multiple of 2L. It is also desirable that the radar receiver 30 set the number of additions, Np, to an integer multiple of 2L.

The Doppler-frequency analyzer 43 may convert the time information into distance information and output the distance information. Time information k is converted into distance information R(k) through use of:

$$R(k) = k \frac{TwC0}{2L} \quad (11)$$

In expression (11), Tw represents a code transmission segment, L represents a pulse code length, and C0 represents a speed of light.

Also, the Doppler-frequency analyzer 43 may convert Doppler frequency information into relative-speed components and output the relative-speed components. The Doppler frequency fsΔΦ is converted into relative-speed components vd(fs) through use of:

$$vd(fs) = \frac{\lambda}{2} fs \Delta \theta \quad (12)$$

In expression (12), λ is the wavelength of the carrier frequency of transmission signals output from the transmission wireless unit 25.

Figure 3:
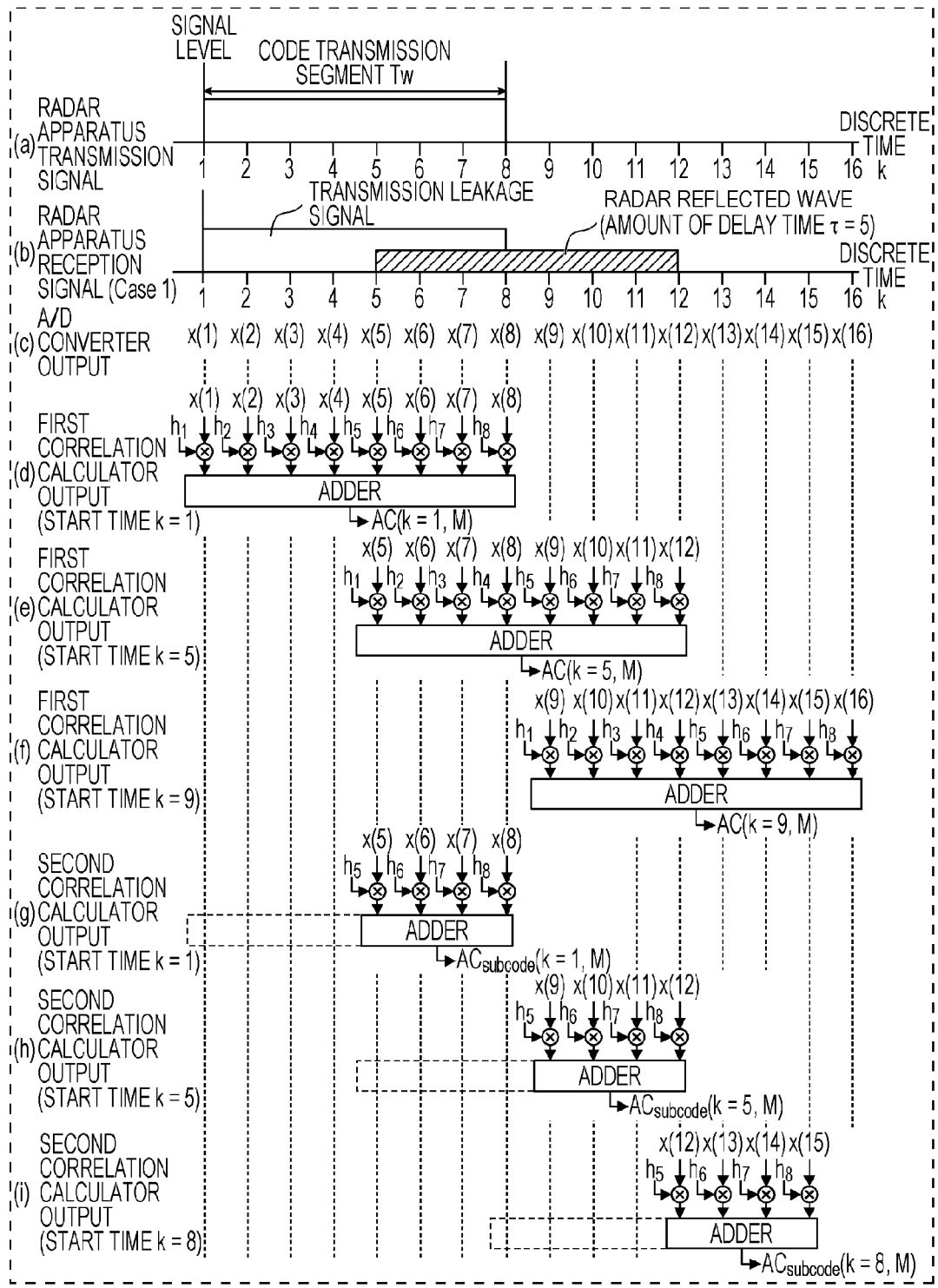
FIG. 3 illustrates an operation of a calculator in FIG. 1.

Next, an operation of the calculator 38 described above will be described with reference to FIG. 3. FIG. 3 illustrates an operation of the calculator 38 for a case of Ns=1, L=8, Q=4, and U=Ns×L=8.

FIG. 3(a) illustrates transmission signals of the radar apparatus 10, and FIG. 3(b) illustrates a case (Case 1) in which a radar reflected wave with the amount of delay time τ=5 is further received while transmission leakage signals are received as reception signals of the radar apparatus 10.

FIG. 3(c) illustrates outputs x(k) of the A/D converters 37a and 37b in the M-th transmission period. The outputs x(1), x(2), . . . , and x(8) of the A/D converters 37a and 37b include components of the transmission leakage signals. The outputs x(5), x(6), . . . , and x(12) of the A/D converters 37a and 37b include signal components of a radar reflected wave with the amount of delay time k=5.

FIGS. 3(d), 3(e), and 3(f) illustrate the relationships of inputs and outputs of the first correlation calculator 39 at k=1, 5, and 9, respectively. The multiplication coefficients $h_n$ in FIGS. 3(d), 3(e), and 3(f) represent a(M)$_n$*. FIGS. 3(g), 3(h), and 3(i) illustrate the relationships of inputs and outputs of the second correlation calculator 40 at k=1, 5, and 8, respectively. The multiplication coefficients $h_n$ in FIGS. 3(g), 3(h), and 3(i) represent a(M)$_n$*.

In this case, when the input level of transmission leakage signals is high, and nonlinear distortion occurs, the outputs x(1), x(2), . . . , and x(8) of the A/D converters 37a and 37b include nonlinear distortion components. Consequently, the range sidelobe level of the outputs of the calculator 38 to which signal components including the nonlinear distortion components are input increases significantly owing to influences of the nonlinear distortion components.

Of the outputs AC(k, M) of the first correlation calculator 39, the outputs in the time range of k=1, U (=8) include the outputs x(1), x(2), . . . , and x(8) of the A/D converters 37a and 37b in the segment in which the transmission leakage signals are received. For example, in FIG. 3(d), the outputs x(1), . . . , and x(8) are input to the first correlation calculator 39, and the first correlation calculator 39 performs calculation of correlation between x(1), . . . , and x(8) and transmission codes A(M)={a(M)$_1$, a(M)$_2$, a(M)$_L$} having the code length L and outputs AC(1, M) as a calculation result.

Similarly, in FIG. 3(e), the outputs x(5), . . . , and x(12) are input to the first correlation calculator 39, and the first correlation calculator 39 performs calculation of correlation between x(5), . . . , and x(12) and transmission codes A(M)={a(M)$_1$, a(M)$_2$, . . . , a(M)$_L$} having the code length L and outputs AC(5, M) as a calculation result.

As described above, when the input level of transmission leakage signals is high, and nonlinear distortion occurs, the outputs x(1), x(2), . . . , and x(8) of the A/D converters 37a and 37b include nonlinear distortion components. Consequently, the range sidelobe level of the outputs AC(k, M) of the calculator 38 in the time range of k=1, . . . , U (=8) increases significantly owing to influences of the nonlinear distortion components.

On the other hand, of the outputs AC(k, M) of the first correlation calculator 39, the outputs after k=U+1 (=8+1=9) do not include the outputs x(1), x(2), . . . , and x(8) of the A/D converters 37a and 37b in the segment in which the transmission leakage signals are received. For example, in FIG. 3(f), the outputs x(9), . . . , and x(16) are input to the first correlation calculator 39, and the first correlation calculator 39 performs calculation of correlation between x(9), . . . , and x(16) and transmission codes A(M)={a(M)$_1$, a(M)$_2$, a(M)$_L$} having the code length L and outputs AC(9, M) as a calculation result.

As described above, even when the input level of the transmission leakage signals is high, and nonlinear distortion occurs, the outputs AC(k, M) of the first correlation calculator 39 after k=U+1 (=9) are not influenced by the nonlinear distortion components, thus making it possible to avoid influences of an increase in the range sidelobe level.

Next, of the outputs AC$_{subcode}$(k, M) of the second correlation calculator 40, the outputs in the time range of k=1, Ns×Q (=4) include the outputs x(1), x(2), . . . , and x(8) of the A/D converters 37a and 37b in the segment in which the transmission leakage signals are received.

For example, in FIG. 3(g), the outputs x(5) to x(8) of the outputs x(1), x(2), . . . , and x(8) are input to the second correlation calculator 40 in order to start calculation from the discrete time k=1, and the second correlation calculator 40 performs the calculation of correlation between x(5) to x(8) and partial codes A$_{[L-Q+1:L]}$(M)={a(M)$_5$, a(M)$_6$, . . . , a(M)$_L$} obtained by extracting Q codes from the tail end of the pulse compression codes A(M) of the code length L to be transmitted and outputs AC$_{subcode}$(1, M) as a calculation result.

As described above, when the input level of transmission leakage signals is high and nonlinear distortion occurs in the outputs AC$_{subcode}$(k, M) of the second correlation calculator 40 in the time range of k=1, . . . , Ns×Q (=4), the outputs x(1), x(2), . . . , and x(8) of the A/D converters 37a and 37b include nonlinear distortion components. Consequently, the range sidelobe level of the outputs of the calculator 38 to which signal components including the nonlinear distortion components are input increases significantly owing to influences of the nonlinear distortion components.

On the other hand, after the discrete time k=Ns×Q+1 (=4+1=5), the outputs AC$_{subcode}$(k, M) of the second correlation calculator 40 do not include the outputs x(1), x(2), . . . , and x(8) of the A/D converters 37a and 37b in the segment in which the transmission leakage signals are received.

For example, in FIG. 3(h), the outputs x(9) to x(12) of the outputs x(5), x(6), . . . , and x(12) are input to the second correlation calculator 40 in order to start calculation from the discrete time k=5, the second correlation calculator 40 performs the calculation of correlation between x(9) to x(12) and partial codes $A_{[L-Q+1:L]}(M)=\{a(M)_5, a(M)_6, \ldots, a(M)_L\}$ obtained by extracting Q codes from the tail end of the pulse compression codes A(M) of the code length L to be transmitted from the radar transmitter 20 and outputs $AC_{subcode}$(5, M) as a calculation result.

Similarly, in FIG. 3(i), the outputs x(12) to x(15) of the outputs x(8), x(9), . . . , and x(15) are input to the second correlation calculator 40 in order to start calculation from the discrete time k=8, and the second correlation calculator 40 performs the calculation of correlation between x(12) to x(15) and L–Q partial codes $A_{[L-Q+1:L]}(M)=\{a(M)_5, a(M)_6, \ldots, a(M)_L\}$ obtained by extracting Q codes from the tail end of the pulse compression codes A(M) of the code length L to be transmitted from the radar transmitter 20 and outputs $AC_{subcode}$(8, M) as a calculation result.

As described above, during output of the outputs $AC_{subcode}$(k, M) of the second correlation calculator 40 after k=Ns×Q+1 (=4+1=5), even when the input level of the transmission leakage signals is high, and nonlinear distortion occurs, influences of the nonlinear distortion components can be reduced and influences of an increase in the range sidelobe level can be suppressed in a code sequence transmitted from the radar transmitter 20, through use of the characteristics represented by expressions (3), (4), and (5).

With respect to such outputs of the first correlation calculator 39 and the second correlation calculator 40, the output switching unit 41 outputs the calculation results $AC_{subcode}$(k, M) of the second correlation calculator 40 in the period of the discrete time k=1, U and outputs the calculation results AC(k, M) of the first correlation calculator 39 in the period of the discrete time k≥U+1.

As a result, even when the input level of transmission leakage signals is high, and nonlinear distortion occurs, the radar receiver 30 is not influenced by nonlinear distortion components in the time range of the discrete time k≥Ns×Q+1. This makes it possible to avoid influences of an increase in the range sidelobe level and makes it possible to improve the detection performance when a reflected wave from a low-RCS object exists.

When the input level of transmission leakage signals is high, and nonlinear distortion occurs, the radar receiver 30 can detect, even in a smaller range of discrete times k, a radar reflected wave having a low signal level without a significant increase in the range sidelobe level, compared with a case in which the relationship U>Ns×Q is satisfied for L>Q and the second correlation calculator 40 is not used.

For example, as illustrated in FIG. 3(b), in a case (Case 1) in which the radar apparatus 10 further receives a radar reflected wave with the amount of delay time k=Q+1 (=4+1=5) during reception of transmission leakage signals as reception signals, the first correlation calculator 39, the second correlation calculator 40, and the output switching unit 41 perform operations as described above. Thus, after the amount of delay time k=Ns×Q+1 (=4+1=5), even when the input level of transmission leakage signals is high, and nonlinear distortion occurs, there are no influences of nonlinear distortion components. This makes it possible to detect a radar reflected wave while avoiding influences of an increase in the range sidelobe level.

When the partial code length Q is reduced in the radar apparatus 10, the pulse compression gain is reduced, but it is possible to further reduce influences of transmission signals (transmission leakage signals) that leak to the receiving antenna 31. Thus, even when the sidelobe level increases owing to influences of nonlinear distortion components resulting from transmission leakage, the radar apparatus 10 can detect a reflected wave having a low signal level without being masked, as long as the amount of delay time of the reflected wave from a target is larger than or equal to the amount of time corresponding to the partial code length Q.

In the radar apparatus 10, through use of the partial codes, the addition gain based on codes is reduced to Q/L relative to the original code length L. Thus, when a predetermined amount of delay time after which no nonlinear distortion occurs passes, that is, after k=U+1, the output switching unit 41 outputs the output of the first correlation calculator 39 to thereby allow the radar apparatus 10 to obtain an addition gain using the original code length L.

As described above, when nonlinear distortion owing to transmission leakage signals does not occur in a time segment (a code transmission segment) in which pulse codes are transmitted from the transmitting antenna 26, U may be set to be smaller than or equal to Ns×L.

Also, when a target that has a large RCS(Radar Cross Section) (a large-RCS object, typified by a vehicle) exists at a distance close to the radar apparatus 10, the reception signal components in a reflected wave that the radar apparatus 10 receives from the large-RCS object are large. Thus, when the amplitude of the reception baseband signals output from the reception wireless unit 32 exceeds the dynamic ranges of the A/D converters 37a and 37b, nonlinear distortion due to clipping occurs. Also, when an input to a low-noise amplifier (LNA) in the reception wireless unit 32 reaches an input level in a saturation region, nonlinear distortion occurs.

When U=Ns×L+τ–1 is set in the output switching unit 41 with respect to the discrete time k=τ at which a reflected wave arrives from such a large-RCS object, the output switching unit 41 connects to the first correlation calculator 39 after the discrete time k=U+1=Ns×L+τ, thereby suppressing influences of the signal components of the reflected wave from the large-RCS object that causes nonlinear distortion components.

On the other hand, in the time range of the discrete time k=1, . . . , U, since the output switching unit 41 outputs the output of the second correlation calculator 40, the radar apparatus 10 can reduce the range in which there are influences of the signal components of the reflected wave from the large-RCS object to the range of the discrete time k=1, . . . , Ns×Q+τ–1. In addition, in the range of the discrete time k=Ns×Q+τ, . . . , U, the radar apparatus 10 can avoid influences of the signal components of a reflected wave from a large-RCS object and can improve the performance of detecting a reflected wave from a low-RCS object.

As described above, the radar apparatus 10 estimates the largest delay time k=τ at which a reflected wave from a large-RCS object arrives in an operating environment and sets U=Ns×L+τ–1 for the output switching unit 41, thereby making it possible to avoid influences of the signal components of a reflected wave from the large-RCS object in the time range of the discrete time k≥Ns×Q+τ. Thus, the radar apparatus 10 can improve the detection performance when a reflected wave from a low-RCS object exists.

Figure 4:
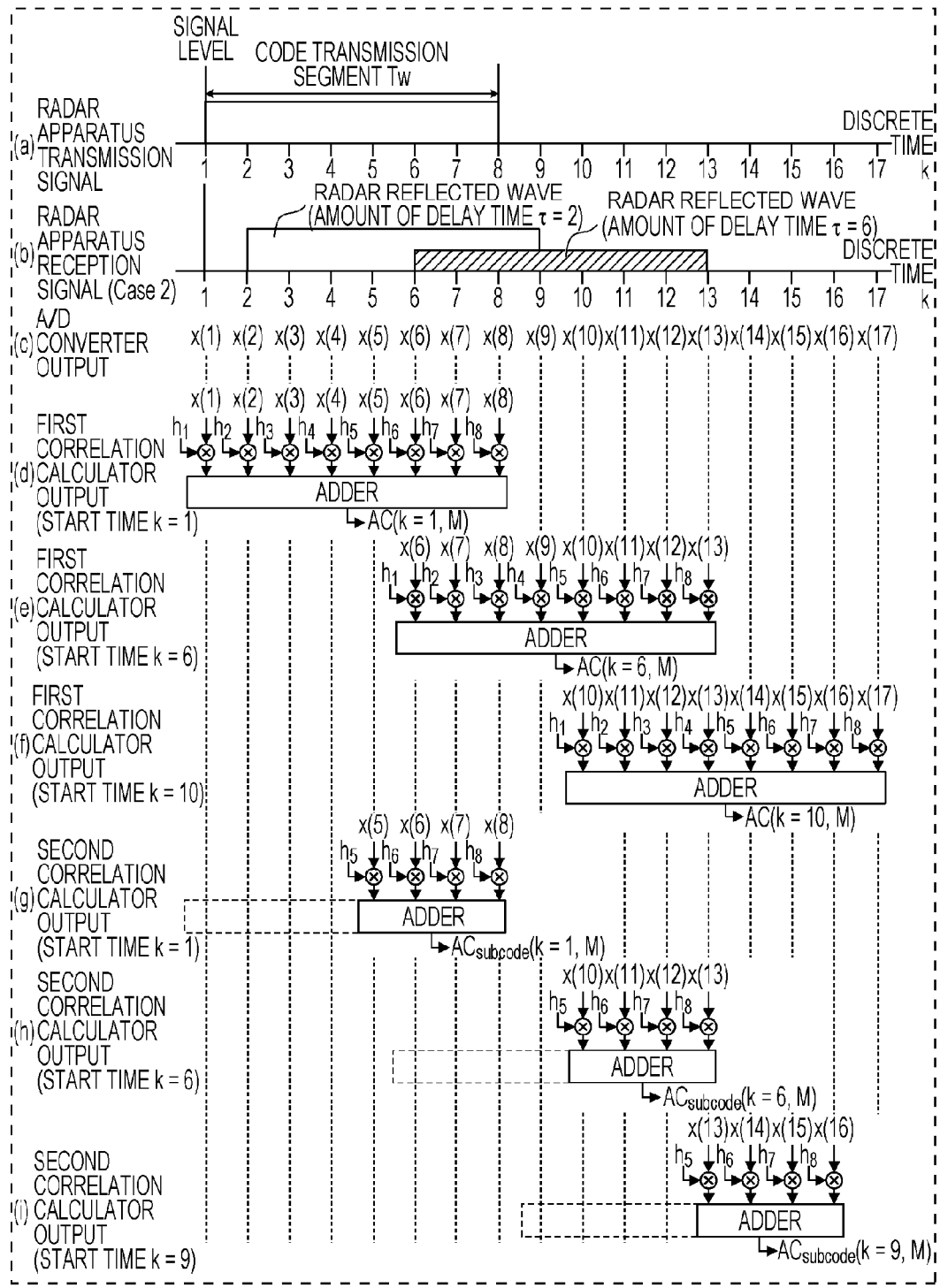
FIG. 4 illustrates an operation of the calculator when a reflected wave from a large-RCS object is received.

Next, the operation of the calculator 38 in the radar receiver 30 that has received a reflected wave from a large-RCS object will be described with reference to FIG. 4. FIG. 4 illustrates an operation of the calculator 38 for Ns=1, L=8, Q=4, and U=Ns×L=8. The time (the amount of delay time) at which a reflected wave from a large-RCS object arrives is the discrete time k=τ.

FIG. 4(a) illustrates transmission signals of the radar apparatus 10, and FIG. 4(b) illustrates a case (Case 2) in which a reflected wave from a large-RCS object is started to be received at the discrete time k=2 (the amount of delay time τ=2) as reception signals of the radar apparatus 10 and further the reception of a radar reflected wave is started at the discrete time k=6 (the amount of delay time τ=6).

FIG. 4(c) illustrates outputs x(k) of the A/D converters 37a and 37b in the M-th transmission period. The outputs x(2), x(3), . . . , and x(9) of the A/D converters 37a and 37b include signal components of a reflected wave from the large-RCS object. The outputs x(6), x(7), . . . , and x(13) of the A/D converters 37a and 37b include signal components of a radar reflected wave with the amount of delay time τ=6.

FIGS. 4(d), 4(e), and 4(f) illustrate the relationships between inputs and outputs of the first correlation calculator 39 that has started calculations at the discrete time k=1, 6, and 10, respectively. In FIGS. 4(d), 4(e), and 4(f), the multiplication coefficients $h_n$ represent $a(M)_n^*$. FIGS. 4(g), 4(h), and 4(i) illustrate the relationships between inputs and outputs of the second correlation calculator 40 that has started calculations at the discrete time k=1, 6, and 9, respectively. In FIGS. 4(g), 4(h), and 4(i), the multiplication coefficients $h_n$ represent $a(M)_n^*$.

In this case, since the radar receiver 30 receives the signal components of the reflected wave from the large-RCS object, the outputs x(2), x(3), . . . , and x(9) of the A/D converters 37a and 37b include nonlinear distortion components. The range sidelobe level of the outputs of the calculator 38 to which the nonlinear distortion components are input increases significantly owing to influences of the nonlinear distortion components.

The outputs AC(k, M) of the first correlation calculator 39 in the period of the discrete time k=1, U (=Ns×L+τ−1=8+2−1=9) include the outputs x(2), x(3), . . . , and x(9) of the A/D converters 37a and 37b in the segment in which the signal components of the reflected wave from the large-RCS object are received. For example, in FIG. 4(d), the outputs x(1), . . . , and x(8) are input to the first correlation calculator 39, and the first correlation calculator 39 performs calculation of correlation between x(1), . . . , and x(8) and transmission codes A(M)={a(M)$_1$, a(M)$_2$, . . . , a(M)$_L$} of the code length L and outputs AC(1, M) as a calculation result. Similarly, in FIG. 4(e), the outputs x(6), . . . , and x(13) are input to the first correlation calculator 39, and the first correlation calculator 39 performs calculation of correlation between x(6), . . . , and x(13) and transmission codes A(M)={a(M)$_1$, a(M)$_2$, . . . a(M)$_L$} of the code length L and outputs AC(6, M) as a calculation result.

Since the outputs x(2), x(3), . . . , and x(9) of the A/D converters 37a and 37b in the segment in which the signal components of the reflected wave from the large-RCS object are received include the nonlinear distortion components, the range sidelobe level of the outputs AC(k, M) of the first correlation calculator 39 in the time range of k=1, . . . , U (=9) increases owing to influences of the nonlinear distortion components.

On the other hand, the outputs AC(k, M) of the first correlation calculator 39 after k=U+1 (=Ns×L+τ−1=10) do not include the outputs x(2), x(3), . . . , and x(9) of the A/D converters 37a and 37b in the segment in which the signal components of the reflected wave from the large-RCS object are received.

For example, in FIG. 4(f), the outputs x(10), . . . , and x(17) are input to the first correlation calculator 39, and the first correlation calculator 39 performs calculation of correlation between x(10), . . . , and x(17) and transmission codes A(M)={a(M)$_1$, a(M)$_2$, . . . , a(M)$_L$} of the code length L and outputs AC(10, M) as a calculation result.

Thus, even when the signal components of a reflected wave from the large-RCS object that causes nonlinear distortion components are received, x(10), . . . , and x(17) input to the first correlation calculator 39 do not include nonlinear distortion components. Thus, the outputs AC(k, M) of the first correlation calculator 39 after k=U+1 (=10) can avoid influences on the range sidelobe level.

Next, a description will be given of the second correlation calculator 40. The outputs x(2), x(3), . . . , and x(9) of the A/D converters 37a and 37b are in the segment in which the signal components of the reflected wave from the large-RCS object are received. Thus, for example, in FIG. 4(g), the outputs x(5) to x(8) of the outputs x(2) to x(9) are input to the second correlation calculator 40, and the second correlation calculator 40 preforms calculation of correlation between x(5) to x(8) and partial codes $A_{[L-Q+1:L]}$(M)={a(M)$_5$, a(M)$_6$, . . . , a(M)$_L$} obtained by extracting Q codes from the tail end of the pulse compression codes A(M) of the code length L to be transmitted, and outputs $AC_{subcode}$(1, M) as a calculation result.

As described above, the outputs $AC_{subcode}$(k, M) of the second correlation calculator 40 in the time range of k=1, . . . , Ns×Q+τ−1 (=5) include the outputs x(2), x(3), . . . , and x(5) of the A/D converters 37a and 37b in the segment in which the signal components of the reflected wave from the large-RCS object are received, and include the nonlinear distortion components. The range sidelobe level of the outputs of the calculator 38 to which the signal components are input increases owing to influences of the nonlinear distortion components.

On the other hand, the outputs $AC_{subcode}$(k, M) of the second correlation calculator 40 after k=Ns×Q+τ (=6) do not include the outputs x(2), x(3), . . . , and x(9) of the A/D converters 37a and 37b in the segment in which the transmission leakage signals are received. For example, in FIG. 4(h), the outputs x(10) to x(13) that do not include the outputs x(2), x(3), . . . , and x(9) are input to the second correlation calculator 40, and the second correlation calculator 40 performs calculation of correlation between x(10) to x(13) and partial codes $A_{[L-Q+1:L]}$(M)={a(M)$_5$, a(M)$_6$, . . . , a(M)$_L$} obtained by extracting Q codes from the tail end of the pulse compression codes A(M) of the code length L to be transmitted, and outputs $AC_{subcode}$(6, M) as a calculation result.

In addition, in FIG. 4(i), the outputs x(13) to x(16) are input to the second correlation calculator 40, and the second correlation calculator 40 preforms calculation of correlation between x(13) to x(16) and partial codes $A_{[L-Q+1:L]}$(M)={a(M)$_5$, a(M)$_6$, . . . , a(M)$_L$} obtained by extracting Q codes from the tail end of the pulse compression codes A(M) of the code length L to be transmitted, and outputs $AC_{subcode}$(9, M) as a calculation result.

That is, at the calculation start time k=6, the first correlation calculator 39 is influenced by the nonlinear distortion components, but the second correlation calculator 40 is not influenced by the nonlinear distortion components.

As described above, even when the outputs $AC_{subcode}$(k, M) of the second correlation calculator 40 after k=Ns×Q+τ (=6) include signal components of a reflected wave from a large-RCS object, it is possible to prevent an increase in the range sidelobe level without being influenced by nonlinear distortion components and it is possible to detect a radar reflected wave having a low signal level, by using using partial codes having a small code length through utilization of the characteristics of code sequences to be transmitted from the radar transmitter 20, the characteristics being represented by expressions (3), (4), and (5) noted above.

With respect to such outputs of the first correlation calculator 39 and the second correlation calculator 40, the output switching unit 41 outputs the calculation results $AC_{subcode}(k, M)$ of the second correlation calculator 40 in the period of the discrete time k=1, U and outputs the calculation results AC(k, M) of the first correlation calculator 39 in the period of the discrete time k≥U+1=Ns×L+τ.

As a result, even when the signal components of a reflected wave from a large-RCS object are received at the discrete time k=τ, there are no influences of nonlinear distortion components in the time range of the discrete time k≥Ns×Q+τ. This makes it possible to suppress an increase in the range sidelobe level and makes it possible to improve the performance of detecting a reflected wave from a low-RCS object.

When the radar receiver 30 receives signal components of a reflected wave from a large-RCS object at the discrete time k=τ, and nonlinear distortion occurs, the radar transmitter 20 transmits transmission codes that satisfy the relationship U>Ns×Q for L>Q, and the radar receiver 30 uses the first correlation calculator 39 and the second correlation calculator 40 to perform the correlation calculations. Thus, in the range of the discrete time k smaller than U, an increase in the range sidelobe level can be suppressed, and a radar reflected wave having a small signal level can be detected.

As described above, in the radar apparatus 10 in the first embodiment, the output switching unit 41 switches between the output of the first correlation calculator 39 that performs calculation of correlation between the discrete samples x(k, M) and pulse compression codes A(M) of the code length L to be transmitted and the output of the second correlation calculator 40 that performs calculation of correlation between the discrete samples x(k, M) and partial codes $A_{[L-Q+1:L]}(M)$ obtained by extracting Q codes from the tail end of the pulse compression codes A(M) of the code length L to be transmitted. Thus, in a time segment (a code transmission segment) in which pulse codes are transmitted from the transmitting antenna 26, even when the radar receiver 30 is influenced by transmission leakage signals and nonlinear distortion components are generated in the A/D converters 37a and 37B, a reflected wave can be detected without being masked by the sidelobes of the transmission leakage signals, as long as the amount of delay time τ of the reflected wave is larger than or equal to a time corresponding to the partial code length Q.

Additionally, even when nonlinear distortion components are generated owing to the presence of a large-RCS object at a distance close to the radar apparatus 10, an increase in the range sidelobes can be suppressed, and the performance of detecting a reflected wave from a low-RCS object can be improved, as long as the amount of delay time of a reflected wave from the large-RCS object is in a time segment that is larger than or equal to a sub-pulse width of the partial code length.

Second Embodiment

Figure 5:
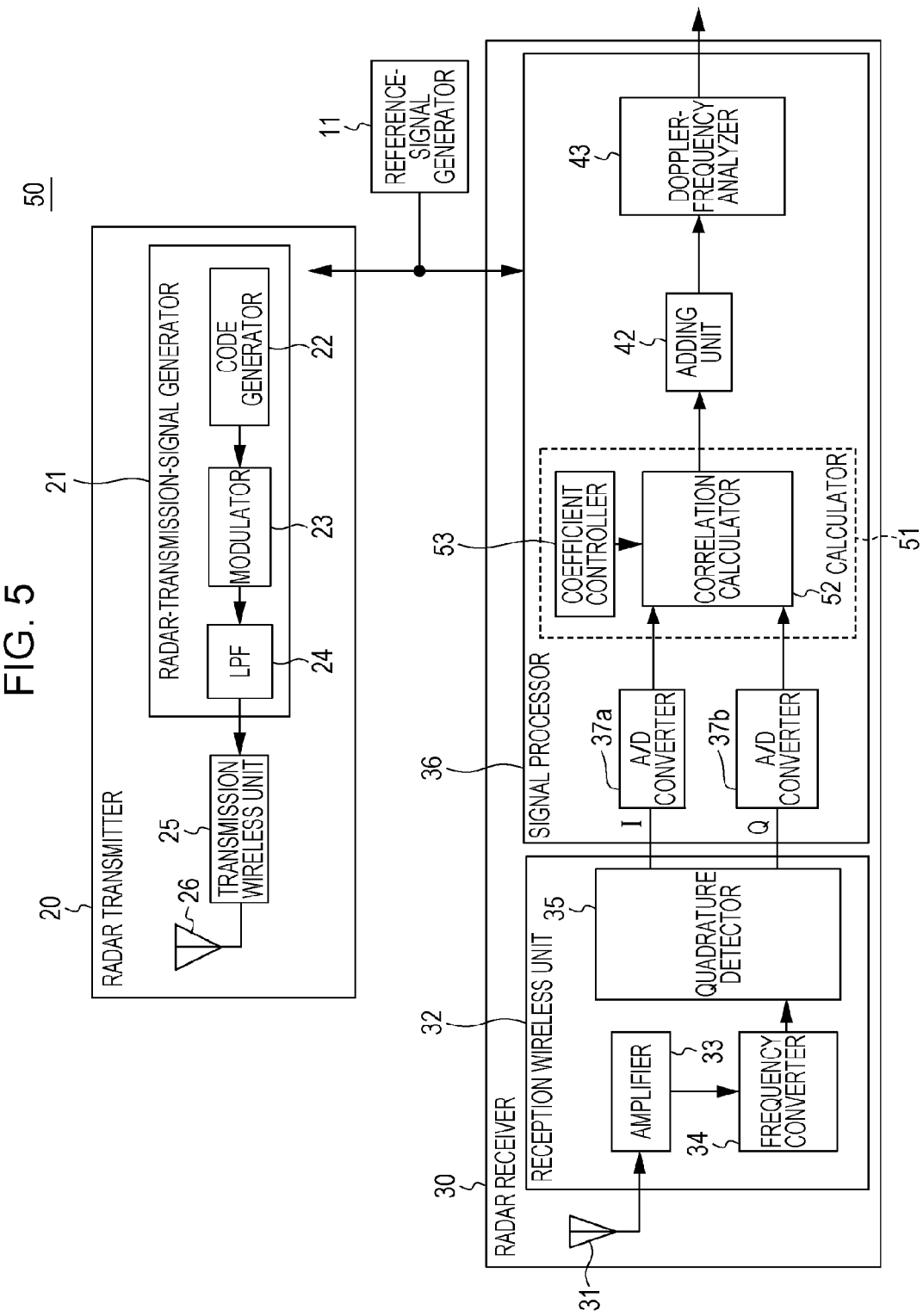
FIG. 5 is a block diagram illustrating the configuration of a radar apparatus according to a second embodiment of the present disclosure.

FIG. 5 is a block diagram illustrating the configuration of a radar apparatus 50 according to a second embodiment of the present disclosure. FIG. 5 differs from FIG. 1 in that a calculator 51 having a configuration that is different from that of the calculator 38 is used. The calculator 51 includes a correlation calculator 52 and a coefficient controller 53.

In each radar transmission period Tr, the correlation calculator 52 performs switching to output the result of the calculation of the correlation between the discrete samples x(k, M) output from the A/D converters 37a and 37b and the pulse compression codes A(M) of the code length L to be transmitted or the result of the calculation of correlation between the discrete samples x(k, M) and the partial codes $A_{[L-Q+1:L]}(M)=\{a(M)_{L-Q+1}, a(M)_{L-Q+2}, \ldots, a(M)_L\}$ obtained by extracting Q codes from the tail end of the pulse compression codes A(M) of the code length L to be transmitted. The correlation calculator 52 performs the following processing.

In each radar transmission period Tr, the correlation calculator 52 performs calculation of correlation between the discrete samples x(k, M) output from the A/D converters 37a and 37b and the multiplication coefficients $h_n$ having a length that is equal to the code length L of the pulse compression codes A(M) to be transmitted, in accordance with:

$$AC(k, M) = \sum_{n=1}^{L} x(k + N_s(n-1), M) h_n(k) \quad (13)$$

In expression (13), AC(k, M) represents a correlation calculation value at a discrete time k. The coefficient controller 53 varies and controls the multiplication coefficient $h_n$ at each calculation timing of the correlation calculation value AC(k, M) for the discrete time k, where n=1, ..., L, and k=U+1, ..., (Nr+Nu)Ns/No.

In order to achieve a noise level that is equivalent to that of the output the correlation calculator 52, AC(k, M) may be obtained using:

$$AC(k, M) = \frac{1}{\sqrt{N_H(k)/L}} \sum_{n=1}^{L} x(k + N_s(n-1), M) h_n(k) \quad (14)$$

In expression (14), $N_H(k)$ represents the number of coefficients that are not zeros among L multiplication coefficients. Also, n is 1, ..., and L.

The coefficient controller 53 varies and controls the multiplication coefficient $h_n$ at the calculation timing of the correlation calculation value AC(k, M) for each discrete time k. That is, in the period of the discrete time k=1, ..., U, in order to perform calculation of correlation between the discrete samples x(k, M) and partial codes $A_{[L-Q+1:L]}(M)=\{a(M)_{L-Q+1}, a(M)_{L-Q+2}, \ldots, a(M)_L\}$ obtained by extracting Q codes from the tail end of the pulse compression codes A(M) of the code length L to be transmitted, the coefficient controller 53 sets the multiplication coefficients $h_n$ in accordance with:

$$\begin{cases} h_n(k) = 0, & \text{when } n = 1, \ldots, L-Q \\ h_n(k) = a(M)_n^*, & \text{when } n = L-Q+1, \ldots, L \end{cases} \quad (15)$$

where L>Q≥2.

Also, in the period of the discrete time k≥U+1, in order to perform calculation of correlation between the discrete samples x(k, M) and pulse compression codes A(M) of the code length L to be transmitted, the coefficient controller 53 sets the multiplication coefficients $h_n$ in accordance with:

$$h_n(k) = a(M)_n^*, \text{when } n=1, \ldots, L \quad (16)$$

Figure 6:
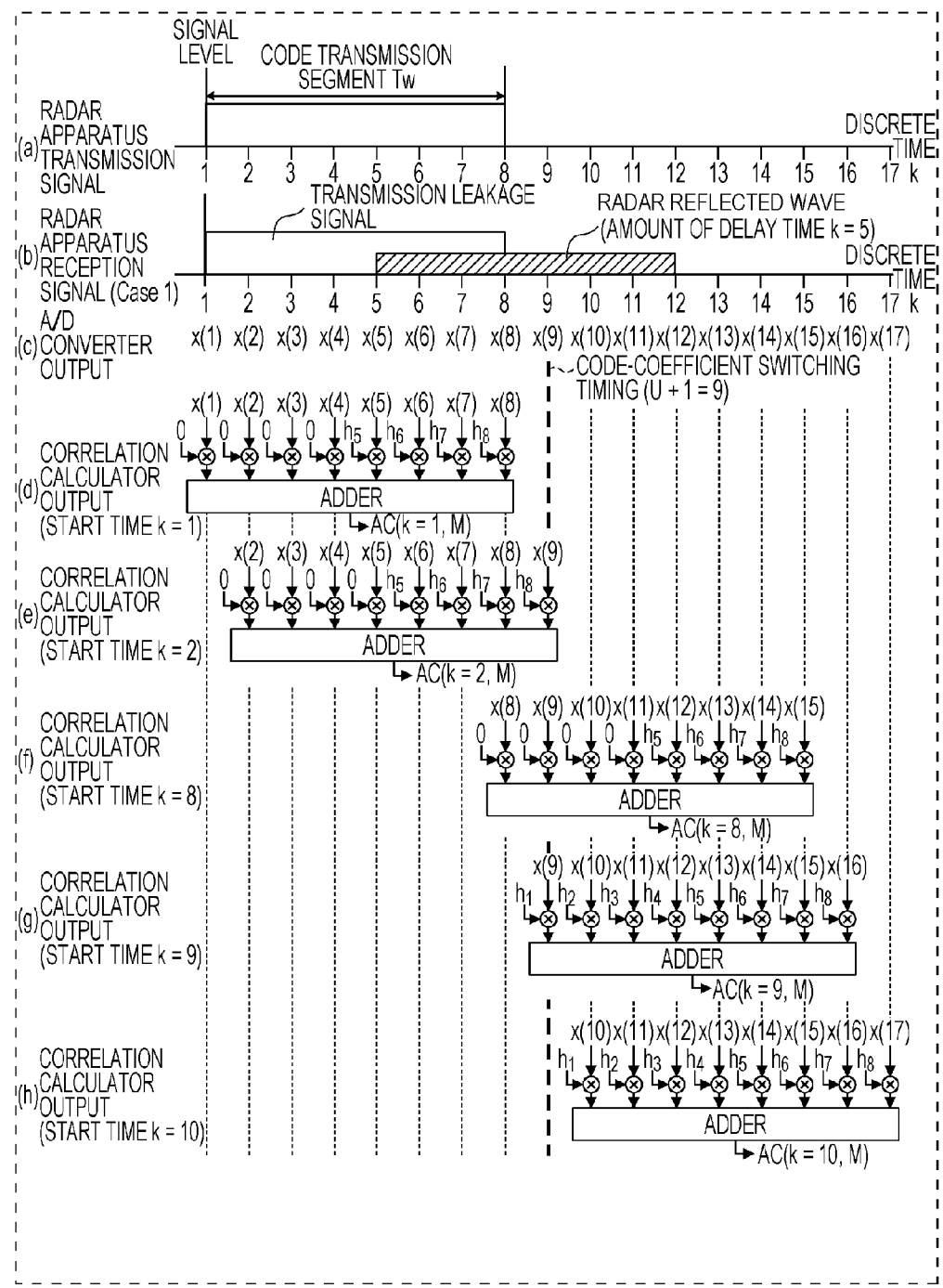
FIG. 6 illustrates an operation of a calculator in FIG. 5.

Next, an operation of the calculator 51 described above will be described with reference to FIG. 6. FIG. 6 illustrates an operation of the calculator 51 for Ns=1, L=8, Q=4, and U=Ns×L=8.

FIG. 6(*a*) illustrates transmission signals of the radar apparatus 50, and FIG. 6(*b*) illustrates a case (Case 1) in which a radar reflected wave with the amount of delay time k=5 is further received during reception of transmission leakage signals as reception signals of the radar apparatus 50.

FIG. 6(*c*) illustrates outputs x(k) of the A/D converters 37*a* and 37*b* in the M-th transmission period. The outputs x(1), x(2), . . . , and x(8) of the A/D converters 37*a* and 37*b* include components of the transmission leakage signals. The outputs x(5), x(6), . . . , and x(12) of the A/D converters 37*a* and 37*b* include signal components of the radar reflected wave with the amount of delay time k=5.

FIGS. 6(*d*), 6(*e*), 6(*f*), 6(*g*), and 6(*h*) illustrate the relationships between inputs and outputs of the correlation calculator 52 at k=1, 2, 8, 9, and 10, respectively.

In FIGS. 6(*d*), 6(*e*), and 6(*f*), in the period of the discrete time k=1, . . . , U (=8), the coefficient controller 53 sets the multiplication coefficients $h_n$, as in expression (17) below.

In FIGS. 6(*e*) and 6(*f*), after k=9, the coefficient controller 53 sets the multiplication coefficients $h_n$, as in FIGS. 6(*g*) and 6(*h*).

$$h_1=h_2=h_3=h_4=0, h_5=a(M)_5^*, h_6=a(M)_6^*, h_7=a(M)_7^*, h_8=a(M)_8^* \quad (17)$$

In FIGS. 6(*g*) and 6(*h*), in the period of the discrete time k≥U+1 (=9), the coefficient controller 53 sets the multiplication coefficients $h_n$, as in:

$$h_1=a(M)_1^*, h_2=a(M)_2^*, h_3=a(M)_3^*, h_4=a(M)_4^*, h_5=a(M)_5^*, h_6=a(M)_6^*, h_7=a(M)_7^*, h_8=a(M)_8^* \quad (18)$$

As described above, since the coefficient controller 53 varies and controls the correlation coefficients in the correlation calculator 52, the radar apparatus 50 can realize correlation calculation using partial codes without using a plurality of correlators and can provide advantages that are the same as or similar to those in the first embodiment. In addition, the radar apparatus 50 makes it possible to simplify the circuit configuration.

As described above, according to the radar apparatus 50, when nonlinear distortion owing to transmission leakage signals does not occur in the time segment (code transmission segment) in which the pulse codes are transmitted from the transmitting antenna, U, which is a parameter indicating a code-coefficient switching timing at which the coefficient controller 53 varies and controls the multiplication coefficient $h_n$, may be set to be smaller than or equal to Ns×L.

Also, in the radar apparatus 50 in the present embodiment, the coefficient controller 53 may be operated in order to allow correlation calculation using a plurality of partial codes. In this case, a time range in which the range sidelobe level increases significantly owing to influences of nonlinear distortion can be reduced, and a time range in which an addition gain obtained with codes is impaired can be limited to a smaller time range.

Next, a description will be given of an operation of the coefficient controller 53 that performs correlation calculation using two partial codes.

In the period of the discrete time k=1, . . . , $U^{(1)}$, in order to perform calculation of correlation between the discrete samples x(k, M) and partial codes $A_{[L-Q^{(1)}+1:L]}(M)=\{a(M)_{L-Q^{(1)}+1}, a(M)_{L-Q^{(1)}+2}, \ldots, a(M)_L\}$ obtained by extracting $Q^{(1)}$ codes from the tail end of the pulse compression codes A(M) of the code length L to be transmitted, the coefficient controller 53 sets the multiplication coefficients $h_n$ in accordance with:

$$\begin{cases} h_n(k) = 0, & \text{when } n = 1, \ldots, L - Q^{(1)} \\ h_n(k) = a(M)_n^*, & \text{when } n = L - Q^{(1)} + 1, \ldots, L \end{cases} \quad (19)$$

where $L > Q^{(1)} \geq 2$.

Also, in the period of the discrete time k=$U^{(1)}$+1, . . . , $U^{(2)}$, in order to perform calculation of correlation between the discrete samples x(k, M) and partial codes $A_{[L-Q^{(2)}+1:L]}(M)=\{a(M)_{L-Q^{(2)}+1}, a(M)_{L-Q^{(2)}+2}, \ldots, a(M)_L\}$ obtained by extracting $Q^{(2)}$ codes from the tail end of the pulse compression codes A(M) of the code length L to be transmitted, the coefficient controller 53 sets the multiplication coefficients $h_n$ in accordance with:

$$\begin{cases} h_n(k) = 0, & \text{when } n = 1, \ldots, L - Q^{(2)} \\ h_n(k) = a(M)_n^*, & \text{when } n = L - Q^{(2)} + 1, \ldots, L \end{cases} \quad (20)$$

where $L > Q^{(2)} > Q^{(1)} \geq 2$.

Also, in the period of the discrete time k≥$U^{(2)}$+1, in order to perform calculation of correlation between the discrete samples x(k, M) and pulse compression codes A(M) of the code length L to be transmitted, the coefficient controller 53 sets the multiplication coefficients $h_n$ in accordance with:

$$h_n(k) = a(M)_n^*, \text{when } n = 1, \ldots, L \quad (21)$$

In this case, in the radar apparatus 50, when $U^{(1)}$=Ns×$Q^{(2)}$ and $U^{(2)}$=Ns×L are set, influences that the transmission leakage signals have on the outputs of the correlation calculator 52 after k=$U^{(1)}$+1 can be avoided in the time segment (the code transmission segment) in which pulse codes are transmitted from the transmitting antenna 26.

On the other hand, in the radar apparatus 50, in the time segment (the code transmission segment) in which pulse codes are transmitted from the transmitting antenna 26, the range in which the outputs of the correlation calculator 52 for k=1, . . . , $U^{(1)}$ are influenced by signal components of transmission signals which leak to the receiving antenna 31 is the range of the discrete time k=1, . . . , Ns×$Q^{(1)}$, and influences of transmission leakage signals can be avoided in the range of the discrete time k=Ns×$Q^{(1)}$+1, . . . , $U^{(1)}$.

Figure 7:
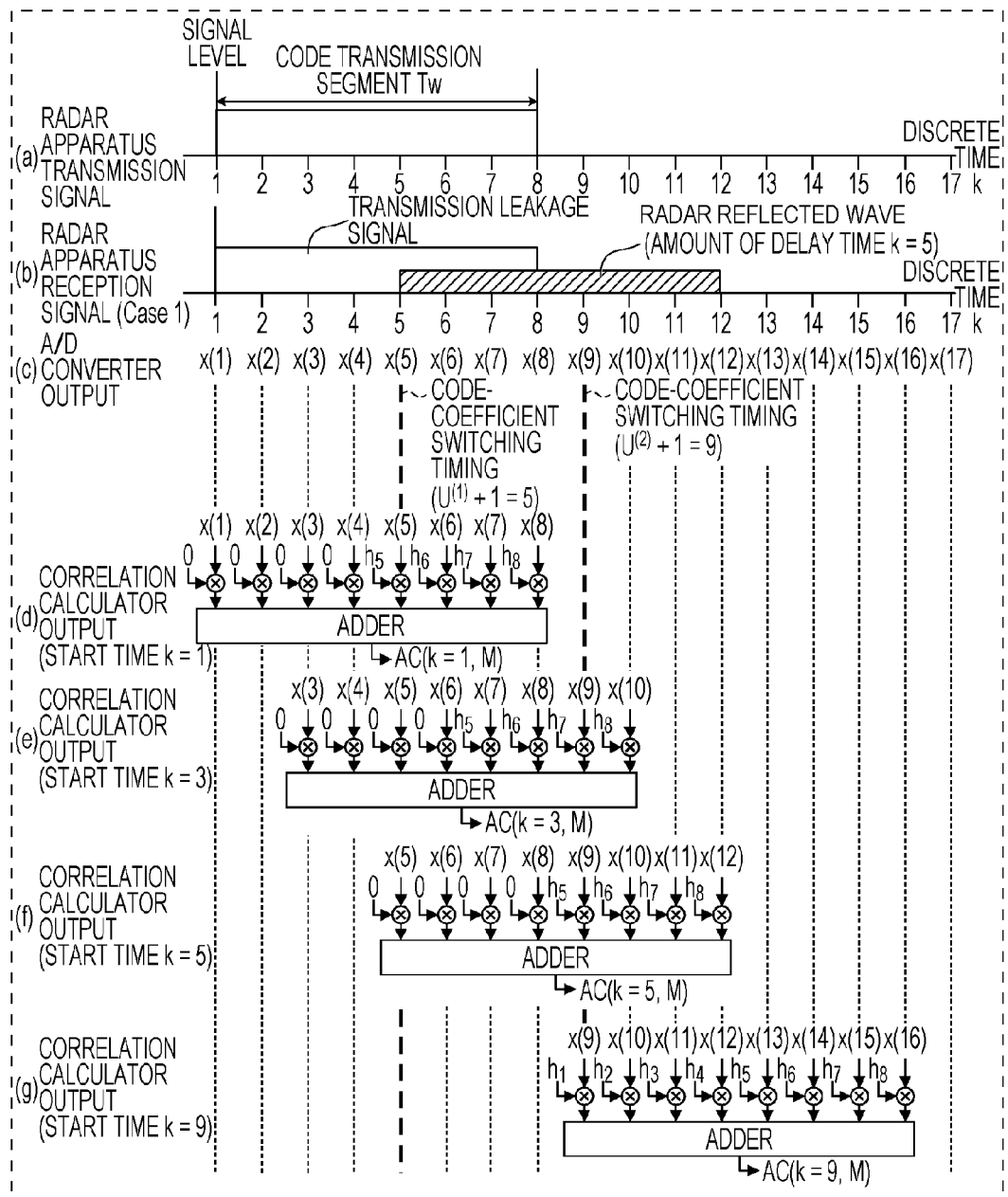
FIG. 7 illustrates an operation of the calculator that performs correlation calculation using two partial codes.

Next, an operation of the calculator 51 that performs correlation calculation using two partial codes will be described with reference to FIG. 7. FIG. 7 illustrates an operation of the calculator 51 for Ns=1, L=8, $Q^{(1)}$=2, $Q^{(2)}$=4, $U^{(1)}$=Ns×$Q^{(2)}$=4, and $U^{(2)}$=Ns×L=8.

FIG. 7(*a*) illustrates transmission signals of the radar apparatus 50, and FIG. 7(*b*) illustrates a case (Case 1) in which a radar reflected wave with the amount of delay time k=5 is further received during reception of transmission leakage signals as reception signals of the radar apparatus 50.

FIG. 7(*c*) illustrates outputs x(k) of the A/D converters 37*a* and 37*b* in the M-th transmission period. The outputs x(1), x(2), . . . , and x(8) of the A/D converters 37*a* and 37*b* include components of the transmission leakage signals. The outputs x(5), x(6), . . . , and x(12) of the A/D converters 37*a* and 37*b* include components of the transmission leakage signals and signal components of a radar reflected wave with the amount of delay time τ=5.

FIGS. 7(d), 7(e), 7(f), and 7(g) illustrate the relationships of inputs and outputs of the correlation calculator 52 at the discrete time k=1, 3, 5, and 9, respectively.

In the period of the discrete time k=1, ..., $U^{(1)}$=4, the coefficient controller 53 sets the multiplication coefficient $h_n$, as in:

$$h_1=h_2=h_3=h_4=h_5=h_6=0, h_7=a(M)_7^*, h_8=a(M)_8^* \quad (22)$$

Thus, in the period of the discrete time k=1, ..., Ns×$Q^{(1)}$=1, ..., 2, the outputs AC(k, M) of the correlation calculator 52 include some of the outputs x(1), x(2), ..., and x(8) of the A/D converters 37a and 37b in the segment in which transmission leakage signals are received.

For example, in FIG. 7(d), the outputs x(1) to x(8) are input to the correlation calculator 52, and the correlation calculator 52 performs calculation of correlation between x(1) to x(8) and partial codes obtained by extracting $Q^{(1)}$ codes from the tail end of the pulse compression codes A(M) of the code length L to be transmitted, so that what are reflected in a correlation calculation result are x(7) and x(8), and the correlation calculator 52 outputs AC(1, M) as the calculation result.

On the other hand, in the outputs AC(k, M) of the correlation calculator 52 in the period of the discrete time k=Ns×$Q^{(1)}$+1, ..., $U^{(1)}$=3, ..., 4, the outputs x(1), x(2), ..., and x(8) of the A/D converters 37a and 37b in the segment in which the transmission leakage signals are received are in a range in which they are not reflected in the correlation calculation result.

For example, in FIG. 7(e), the outputs x(3) to x(10) are input to the correlation calculator 52, and the correlation calculator 52 performs calculation of correlation between x(3) to x(10) and partial codes obtained by extracting $Q^{(1)}$ codes from the tail end of the pulse compression codes A(M)s of the code length L to be transmitted, so that only x(9) and x(10) are reflected in a correlation calculation result, and the correlation calculator 52 outputs AC(3, M) as a calculation result.

Next, in the period of the discrete time k=$U^{(1)}$+1, ..., $U^{(2)}$=5, ..., 8, the coefficient controller 53 sets the multiplication coefficients $h_n$ in accordance with:

$$h_1=h_2=h_3=h_4=0, h_5=a(M)_5^*, h_6=a(M)_6^*, h_7=a(M)_7^*,\\ h_8=a(M)_8^* \quad (23)$$

Thus, in the correlation calculator 52, in the time range of k=$U^{(1)}$+1, ..., $U^{(2)}$=5, ..., 8, the outputs x(1), x(2), ..., and x(8) of the A/D converters 37a and 37b in the segment in which the transmission leakage signals are received are in a range in which they are not reflected in a correlation calculation result.

For example, in FIG. 7(f), the outputs x(5) to x(12) are input to the correlation calculator 52, and the correlation calculator 52 performs calculation of correlation between x(5) to x(12) and partial codes obtained by extracting $Q^{(2)}$ (=4) codes from the tail end of the pulse compression codes A(M) of the code length L to be transmitted, so that what are reflected in a correlation calculation result are in the range of x(9) to x(12), and the correlation calculator 52 outputs AC(5, M) as a calculation result.

As described above, even when the input level of the transmission leakage signals is high, and nonlinear distortion occurs, the range after x(9) of the outputs from the correlation calculator 52 with respect to the discrete time k=$U^{(1)}$+1, ..., $U^{(2)}$=5, ..., 8 is reflected in a correlation calculation result, and thus there are no influences of nonlinear distortion components. This makes it possible to detect a radar reflected wave while avoiding influences of an increase in the range sidelobe level.

In this case, when $Q^{(2)}$, which is a partial code length larger than $Q^{(1)}$, is used for the discrete time k=$U^{(1)}$+1, ..., $U^{(2)}$, it is possible to reduce the range in which an addition gain obtained with codes is impaired.

In the period of the discrete time k≥$U^{(2)}$+1 (=9), the coefficient controller 53 sets the multiplication coefficients $h_n$ in accordance with:

$$h_1=a(M)_1^*, h_2=a(M)_2^*, h_3=a(M)_3^*, h_4=a(M)_4^*, h_5=a\\ (M)_5^*, h_6=a(M)_6^*, h_7=a(M)_7^*, h_8=a(M)_8^* \quad (24)$$

Outputs after k≥$U^{(2)}$+1 (=9) do not include the outputs x(1), x(2), ..., and x(8) of the A/D converters 37a and 37b in the segment in which the transmission leakage signals are received. For example, in FIG. 7(g) illustrating an output AC(9, M) of the correlation calculator 52, the outputs x(9) to x(16) are input to the correlation calculator 52, and the correlation calculator 52 performs calculation of correlation between x(9) to x(16) and transmission codes A(M)={a(M)$_1$, a(M)$_2$, ..., a(M)$_L$} of the code length L and outputs AC(9, M) as a calculation result.

As described above, even when the input level of the transmission leakage signals is high, and nonlinear distortion occurs, the outputs AC(k, M) of the correlation calculator 52 after k≥$U^{(2)}$+1 (=9) are not influenced by the nonlinear distortion components. Thus, even when $Q^{(2)}$, which is a partial code length larger than $Q^{(1)}$, is used, it is possible to avoid influences of an increase in the range sidelobe level.

As described above, since the coefficient controller 53 varies and controls the correlation coefficients in the correlation calculator 52, the radar apparatus 50 can realize correlation calculation using a plurality of partial codes having different code lengths, without using a plurality of correlators, and can provide advantages that are the same as or similar to those in the first embodiment. In addition, the radar apparatus 50 makes it possible to simplify the circuit configuration.

When a large-RCS object exists at a distance close to the radar apparatus 50, the reception signal components in a reflected wave that the radar apparatus 50 receives from the large-RCS object are large. Thus, when the amplitude of reception baseband signals output from the reception wireless unit 32 exceeds the dynamic ranges of the A/D converters 37a and 37b, nonlinear distortion due to clipping occurs in the radar apparatus 50. Also, when an input to an LNA in the reception wireless unit 32 reaches an input level in the saturation region, nonlinear distortion occurs.

With respect to the discrete time k=τ at which a reflected wave from a large-RCS object that causes such nonlinear distortion components arrives, the coefficient controller 53 sets $U^{(1)}$=Ns×$Q^{(2)}$+τ−1 and $U^{(2)}$=Ns×L+τ−1 and varies and controls the correlation coefficients in the correlation calculator 52. Thus, influences of signal components of a reflected wave from a large-RCS object can be suppressed in the outputs of the correlation calculator 52 after k=Ns×$Q^{(1)}$+τ.

Third Embodiment

A radar reception wave whose arrival delay is large is influenced by transmission leakage signals in the subsequent transmission period, and thus the range sidelobe characteristic deteriorates. Accordingly, a radar apparatus according to a third embodiment of the present disclosure performs sliding correlation processing using partial codes obtained by extracting M bits from the front end of transmission codes of a code length L. Since the configuration of the radar apparatus according to the third embodiment of the present disclosure has a configuration similar to that described above in the second embodiment with reference to FIG. 5, a description will also be given with reference to FIG. 5.

In each radar transmission period Tr, the correlation calculator 52 performs switching to output a result of calculation of correlation between the discrete samples x(k, M) output from the A/D converters 37a and 37b and the pulse compression codes A(M) of the code length L to be transmitted or a result of calculation of correlation between the discrete samples x(k, M) and partial codes $A_{[1:Qend]}(M)= \{a(M)_1, a(M)_2, \ldots, a(M)_{Qend}\}$ obtained by extracting $Q_{end}$ codes from the front end of the pulse compression codes A(M) of the code length L to be transmitted. The correlation calculator 52 performs the following operation.

In each radar transmission period Tr, the correlation calculator 52 performs calculation of correlation between the discrete samples x(k, M) from the A/D converters 37a and 37b and multiplication coefficients $h_n$ having a length that is equal to the code length L of the pulse compression codes A(M) to be transmitted, in accordance with:

$$AC(k, M) = \sum_{n=1}^{L} x(k + N_s(n-1), M) h_n(k) \quad (25)$$

In this case, AC(k, M) represents a correlation calculation value at a discrete time k.

In order to achieve a noise level that is equivalent to that of the outputs of the correlation calculator 52, AC(k, M) may also be calculated using:

$$AC(k, M) = \frac{1}{\sqrt{N_H(k)/L}} \sum_{n=1}^{L} x(k + N_s(n-1), M) h_n(k) \quad (26)$$

In expression (26), $N_H(k)$ represents the number of coefficients that are not zeros among L multiplication coefficients, where n=1, ..., L.

The coefficient controller 53 varies and controls the multiplication coefficient $h_n$ at the calculation timing of the correlation calculation value AC(k, M) at each discrete time k. That is, in the period of the discrete time k=$U_{end}$+1, ..., (Nr+Nu)Ns/No, in order to perform calculation of correlation between the discrete samples x(k, M) and partial codes $A_{[1:Qend]}(M)=\{a(M)_1, a(M)_2, \ldots, a(M)_{Qend}\}$ obtained by extracting $Q_{end}$ codes from the front end of the pulse compression codes A(M) of the code length L to be transmitted, the coefficient controller 53 sets the multiplication coefficients $h_n$ in accordance with:

$$\begin{cases} h_n(k) = a(M)_n^*, & \text{when } n = 1, \ldots, Q_{end} \\ h_n(k) = 0, & \text{when } n = Q_{end} + 1, \ldots, L \end{cases} \quad (27)$$

where $L > Q_{end} \geq 2$.

Figure 8:
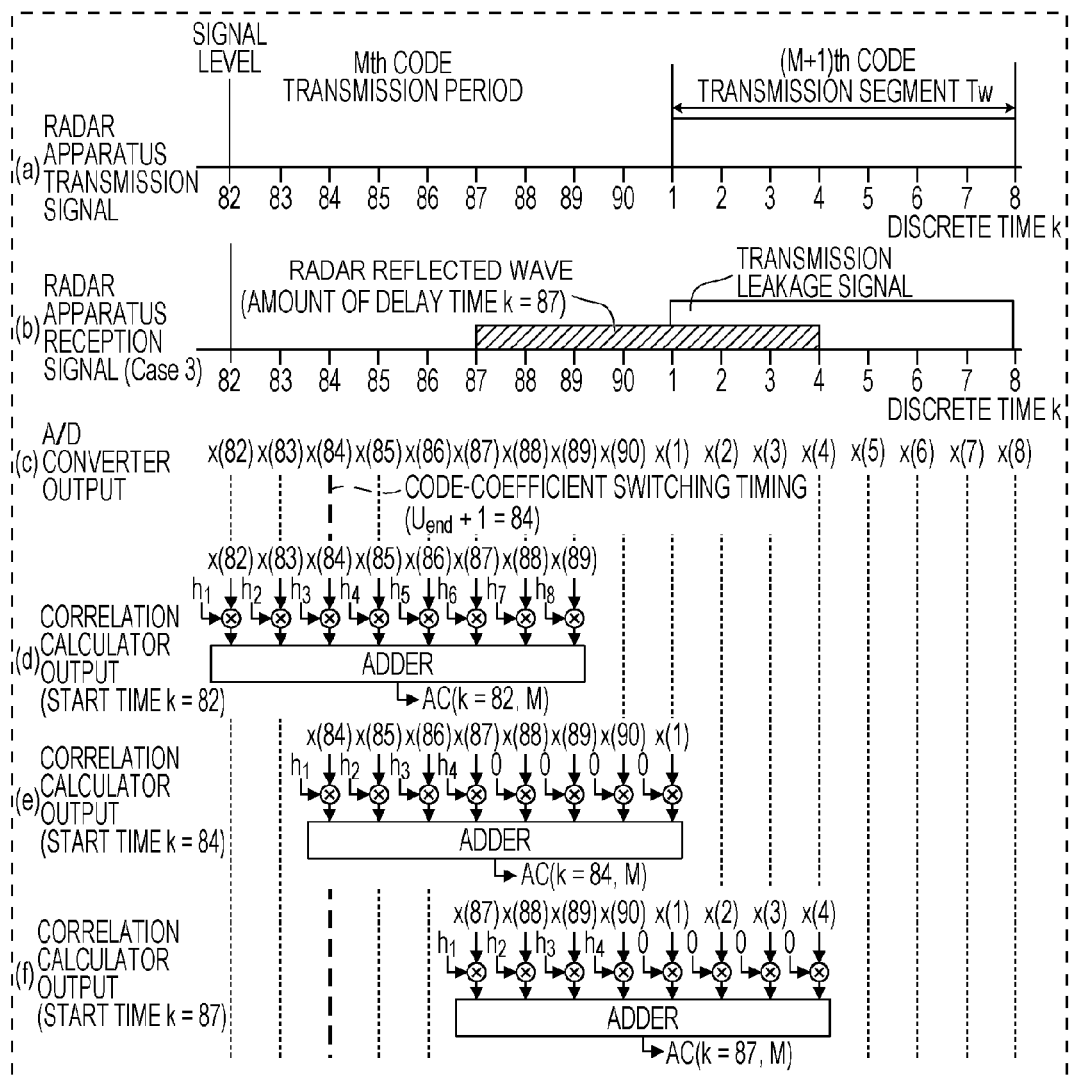
FIG. 8 illustrates an operation of the calculator that performs sliding correlation processing using partial codes obtained by extracting M bits from the front end of transmission cods of a code length L.

Next, an operation of the calculator 51 that performs sliding correlation processing using partial codes obtained by extracting M bits from the front end of transmission codes of the code length L will be described with reference to FIG. 8. FIG. 8 illustrates an operation of the calculator 51 for Ns=1, L=8, $Q_{end}$=4, k=1, ..., 90, and $U_{end}$=83.

FIG. 8(a) illustrates transmission signals of the radar apparatus 50, and FIG. 8(b) illustrates a case (Case 3) in which a radar reflected wave with the amount of delay time k=87 is further received during reception of transmission leakage signals as reception signals of the radar apparatus 50.

FIG. 8(c) illustrates outputs x(k) of the A/D converters 37a and 37b at the tail end in the M-th transmission period and at the front end in the (M+1)th transmission period. The outputs x(82), x(83), ..., and x(90) are outputs of the A/D converters 37a and 37b at the tail end in the M-th transmission period, the outputs x(1), x(2), ..., and x(8) are outputs of the A/D converters 37a and 37b at the front end in the (M+1)th transmission period and include components of transmission leakage signals in the (M+1)th transmission period. The outputs x(87), ..., and x(90), x(1), ..., and x(4) of the A/D converters 37a and 37b include the signal components of a radar reflected wave with the amount of delay time τ=87.

FIGS. 8(d), 8(e), and 8(f) illustrate the relationships of inputs and outputs of the correlation calculator 52 at the discrete time k=82, 84, and 87, respectively.

In FIG. 8(d), in the period of the discrete time k=1, ..., $U_{end}$ (=83), the coefficient controller 53 sets the multiplication coefficients $h_n$, as in (28) below. The reason for $U_{end}$=83 is that this is a limit timing at which the A/D converter output x(1) including next transmission leakage signals is not included during the correlation calculation.

$$h_1=a(M)_1^*, h_2=a(M)_2^*, h_3=a(M)_3^*, h_4=a(M)_4^*, h_5=a(M)_5^*, h_6=a(M)_6^*, h_7=a(M)_7^*, h_8=a(M)_8^* \quad (28)$$

As illustrated in FIGS. 8(e) and 8(f), in the period of the discrete time k=$U_{end}$+1, ..., (Nr+Nu)Ns/No=84, ..., 90, the coefficient controller 53 sets the multiplication coefficients $h_n$, as in:

$$h_1=a(M)_1^*, h_2=a(M)_2^*, h_3=a(M)_3^*, h_4=a(M)_4^*, h_5=0, h_5=0, h_7=0, h_8=0 \quad (29)$$

When the input level of the transmission leakage signals is high, and nonlinear distortion occurs, the outputs x(1), x(2), ..., and x(8) of the A/D converters 37a and 37b include nonlinear distortion components. The range sidelobe level of the outputs of the correlation calculator 52 to which the distortion components are input increases owing to influences of the nonlinear distortion components.

In FIG. 8(e), the outputs x(84), ..., x(90), and x(1) are input to the correlation calculator 52, and the correlation calculator 52 performs calculation of correlation between x(84), ..., x(90), and x(1) and partial codes $A_{[1:Qend]}(M)=\{a(M)_1, a(M)_2, \ldots, a(M)_{Qend}\}$ obtained by extracting $Q_{end}$ (=4) codes from the front end of the pulse compression codes A(M) of the code length L to be transmitted, and outputs AC(84, M) as a calculation result. Since x(88), ..., x(90), and x(1) include influences of the nonlinear distortion components, coefficients for x(87), ..., x(90), and x(1) are set to 0.

In FIG. 8(f), the outputs x(87), ..., x(90), x(1), ..., and x(4) are input to the correlation calculator 52, and the correlation calculator 52 performs calculation of correlation between x(87), ..., x(90), x(1), ..., and x(4) and partial codes $A_{[1:Qend]}(M)=\{a(M)_1, a(M)_2, \ldots, a(M)_{Qend}\}$ obtained by extracting $Q_{end}$ (=4) codes from the front end of the pulse compression codes A(M) of the code length L to be transmitted, and outputs AC(87, M) as a calculation result.

Thus, even when the input level of the transmission leakage signals is high, and nonlinear distortion occurs, the outputs AC(k, M) of the correlation calculator 52 in the time range of k=$U_{end}$+1, $U_{end}$+$Q_{end}$=84, ..., 87 are not influenced by the nonlinear distortion components, thus making it possible to avoid influences of an increase in the range sidelobe level.

Fourth Embodiment

Figure 9:
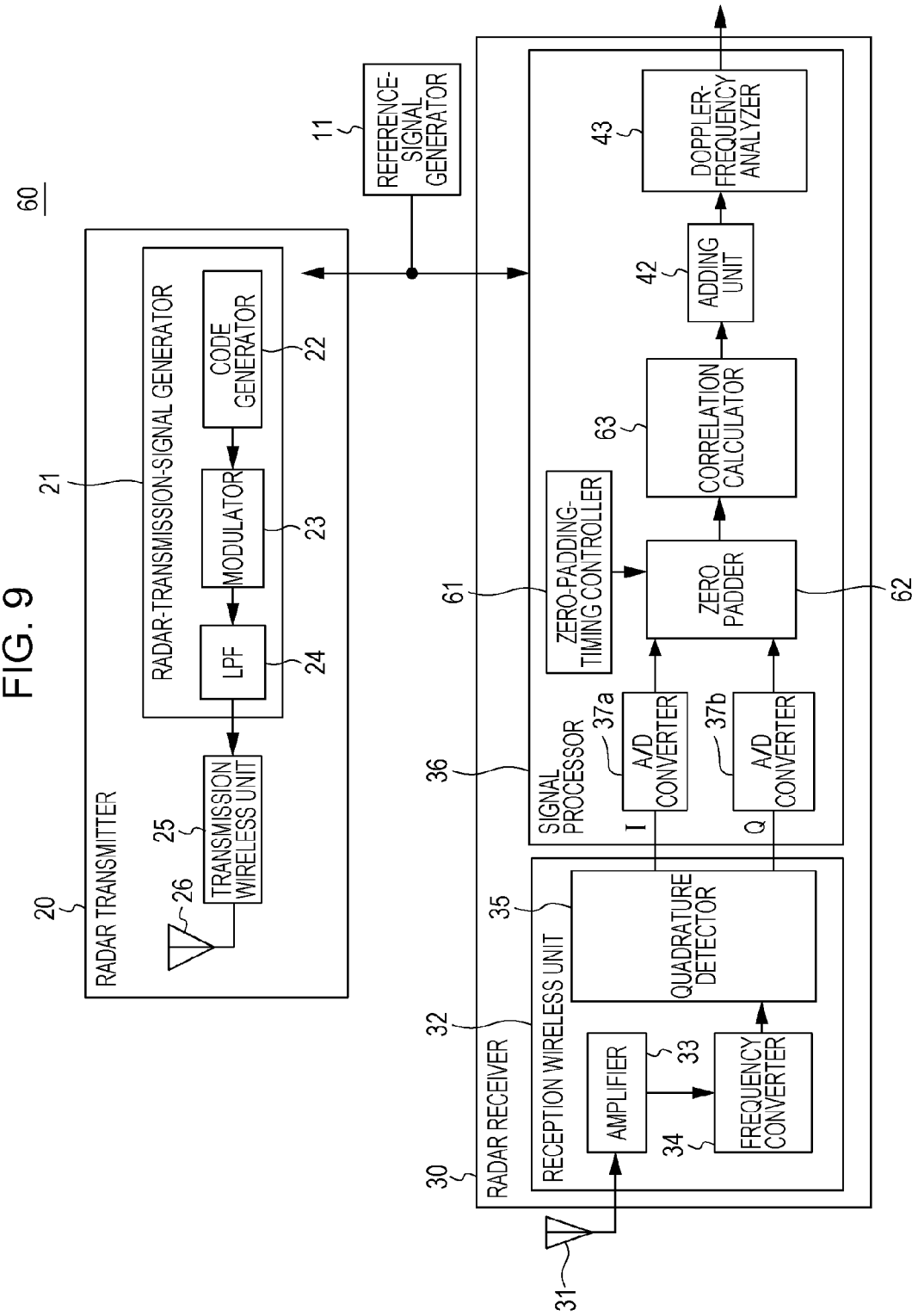
FIG. 9 is a block diagram illustrating the configuration of a radar apparatus according to a fourth embodiment of the present disclosure.

FIG. 9 is a block diagram illustrating the configuration of a radar apparatus 60 according to a fourth embodiment of the present disclosure. FIG. 9 differs from FIG. 1 in that a zero-padding-timing controller 61 and a zero padder 62 are added and the calculator 38 is replaced with a correlation calculator 63.

The zero-padding-timing controller 61 issues, to the zero padder 62, an instruction indicating a timing at which sample values in a certain discrete sample range $[k_{min}, k_{max}]$ are changed to zeros with respect to the discrete samples x(k, M) output from the A/D converters 37a and 37b.

On the basis of the instruction issued from the zero-padding-timing controller 61, the zero padder 62 changes the sample values in the certain discrete sample range $[k_{min}, k_{max}]$ to zeros with respect to the discrete samples x(k, M) output from the A/D converters 37a and 37b and outputs the resulting sample values. That is, the zero padder 62 outputs Z(k, M) in accordance with:

$$\begin{cases} Z(k, M) = 0, & \text{when } k = k_{min}, \ldots, k_{max} \\ Z(k, M) = x(k, M), & \text{when } 1 \le k < k_{min}, k_{max} < k \end{cases} \quad (30)$$

In each radar transmission period Tr, the correlation calculator 63 performs calculation of correlation between Z(k, M) output from the zero padder 62 and pulse compression codes A(M) of the code length L to be transmitted. That is, the correlation calculation in the M-th radar transmission period is performed, for example, in accordance with:

$$AC(k, M) = \sum_{n=1}^{L} Z(k + N_s(n-1), M) a(M)_n^* \quad (31)$$

In expression (31), AC(k, M) represents a correlation calculation value at a discrete time k. The asterisk (*) represents a complex conjugate operator. Also, the calculation of AC(k, M) is performed over the period of k= U+1, . . . , (Nr+Nu)Ns/No.

In order to make the noise levels of outputs of the correlation calculator 63 match each other, equation (32) below may be used for Z(k, M) output from the zero padder 62.

$$AC(k, M) = \frac{1}{\sqrt{N_Z(k)/L}} \sum_{n=1}^{L} Z(k + N_s(n-1), M) a(M)_n^* \quad (32)$$

In expression (32), $N_z(k)$ represents the number of pieces of data that satisfies Z(k, M)=0 among outputs Z(k, M) from the zero padder 62 when AC(k, M) is determined.

In the radar apparatus 60, the zero-padding-timing controller 61 sets, as the certain discrete sample range $[k_{min}, k_{max}]$, a discrete sample range [1, NsxL] in which transmission leakage signals are received, and the zero padder 62 changes the values of the discrete samples x(k, M) with which transmission leakage signals are received to zero in the certain discrete sample range $[k_{min}, k_{max}]$, thereby providing advantages that are the same as or similar to those of the processing for changing the multiplication coefficients in the correlation calculator 63 to zeros.

That is, in the first to third embodiments, control involving changing the correlation coefficients to zeros is performed so that A/D conversion outputs including transmission leakage signals are not included. In contrast, in the present embodiment, influences of nonlinear distortion are suppressed by changing the data, not the correlation coefficients, to zeros.

Accordingly, even when the input level of the transmission leakage signals is high, and nonlinear distortion occurs, the radar apparatus 60 can suppress influences of nonlinear distortion components in the time range of the discrete time [1, NsxL]. This makes it possible to avoid influences of a significant increase in the range sidelobe level and makes it possible to improve the performance of detecting a reflected wave from a low-RCS object.

When the radar apparatus 60 performs calibration of an RF circuit or an antenna by using transmission leakage signals, some of the transmission leakage signals can be extracted by setting the certain discrete sample range $[k_{min}, k_{max}]$, indicated by an instruction from the zero-padding-timing controller 61, to a discrete sample range [α, NsxL] in which the transmission leakage signals are received. In this case, α is set to about 1 to 4.

Figure 10:
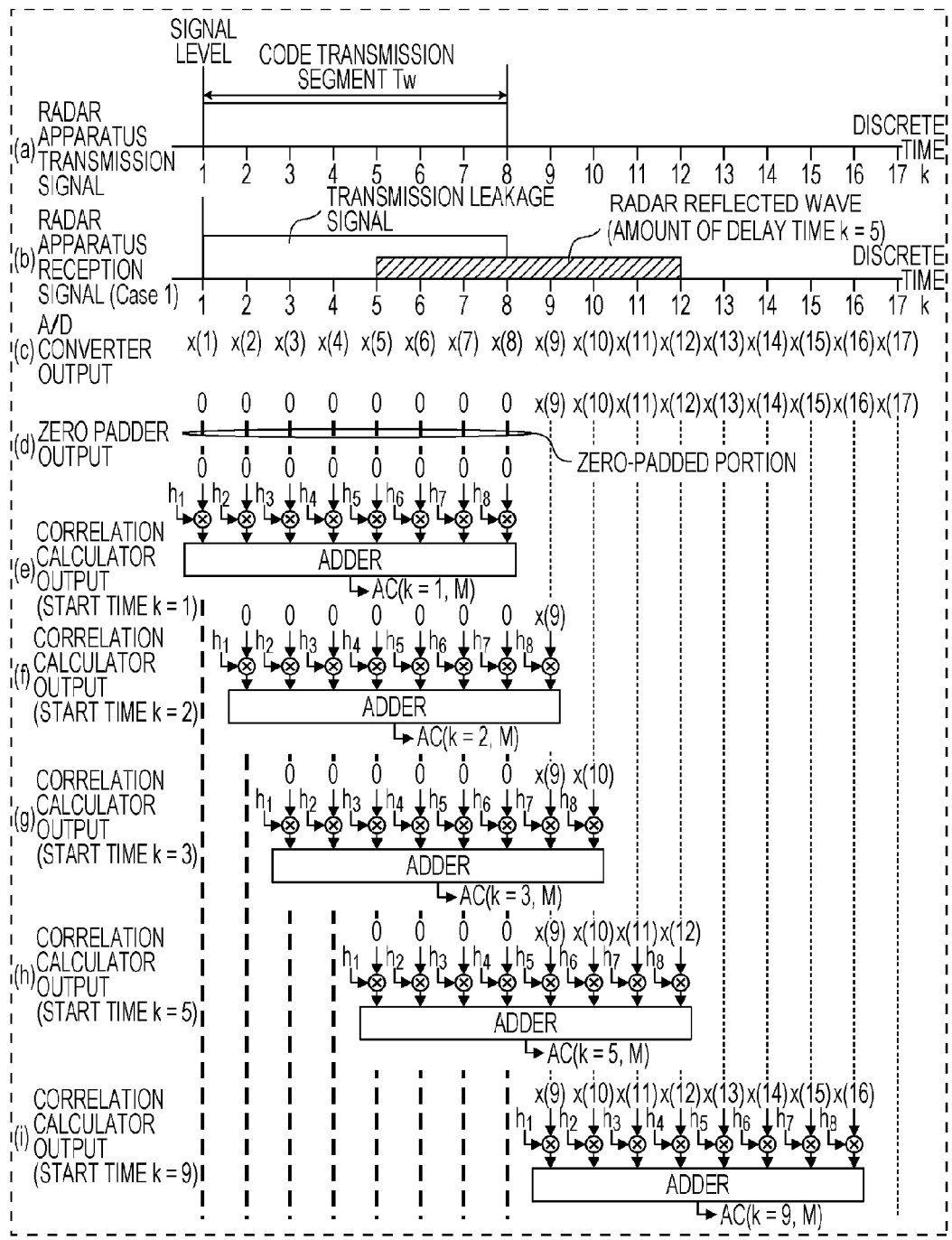
FIG. 10 illustrates an operation of a correlation calculator when discrete samples are padded with zeros.

Next, the operation of the correlation calculator 63 when discrete samples are padded with zeros will be described with reference to FIG. 10. FIG. 10 illustrates an operation of the correlation calculator 63 for Ns=1, L=8, and $[k_{min}, k_{max}]$=[1, NsxL]=[1, 8].

FIG. 10(a) illustrates transmission signals of the radar apparatus 60, and FIG. 10(b) illustrates a case (Case 1) in which a radar reflected wave with the amount of delay time k=5 is further received during reception of transmission leakage signals as reception signals of the radar apparatus 60.

FIG. 10(c) illustrates outputs x(k) of the A/D converters 37a and 37b in the M-th transmission period. The outputs x(1), x(2), . . . , and x(8) of the A/D converters 37a and 37b include components of the transmission leakage signals. The outputs x(5), x(6), . . . , and x(12) of the A/D converters 37a and 37b include signal components of the radar reflected wave with the amount of delay time k=5.

FIG. 10(d) illustrates the values of the outputs Z(k, M) of the zero padder 62 in the M-th transmission period, and the zero padder 62 outputs zeros in the range of the certain discrete sample range $[k_{min}, k_{max}]$=[1, 8] and outputs the outputs x(9), x(10), . . . , and x(17) of the A/D converters 37a and 37b in the other discrete sample range.

FIGS. 10(e), 10(f), 10(g), 10(h), and 10(i) illustrate the relationships between inputs and outputs of the correlation calculator 63 at the discrete time k=1, 2, 3, 5, and 9, respectively. The multiplication coefficients $h_n$ in FIGS. 10(e) to 10(i) represent $a(M)_n^*$.

In this case, when the input level of the transmission leakage signals is high, and nonlinear distortion occurs, the outputs x(1), x(2), . . . , and x(8) of the A/D converters 37a and 37b include nonlinear distortion components. The range sidelobe level of the outputs of the correlation calculator 63 to which distortion components are input increases significantly owing to influences of the nonlinear distortion components.

Outputs AC(k, M) of the correlation calculator 63 in the time range of k=1, . . . , 8 include outputs obtained by changing the outputs x(1), x(2), . . . , and x(8) of the A/D converters 37a and 37b in the segment in which the transmission leakage signals are received to zeros, the changing being performed by the zero padder 62. For example, in FIG. 10(d), signals that all indicate zeros are input to the correlation calculator 63, and the correlation calculator 63 performs calculation of correlation between the signals and transmission codes $A(M)=\{a(M)_1, a(M)_2, \ldots, a(M)_L\}$ of the code length L and outputs $AC(1, M)=0$ as a calculation result.

In FIG. 10(f), zero-padded outputs x(2) to x(8) and an output x(9) are input to the correlation calculator 63, and the correlation calculator 63 performs calculation of correlation between x(2) to x(9) and transmission codes $A(M)=\{a(M)_1, a(M)_2, \ldots, a(M)_L\}$ of the code length L and outputs AC(2, M) as a calculation result. That is, the correlation calculator 63 can obtain outputs that are the same as those of a calculation result obtained for $a(M)_1=a(M)_2=, \ldots, =a(M)_7=0$. Thus, the correlation calculator 63 can obtain outputs that are the same as outputs obtained by performing calculation of correlation between a discrete sample x(k, M) and a partial code $A_{[8:8]}(M)=\{a(M)_L\}$ obtained by extracting one code from the tail end of the pulse compression codes A(M) of the code length L to be transmitted.

In FIG. 10(g), zero-padded outputs x(3) to x(8) and outputs x(9) and x(10) are input to the correlation calculator 63, and the correlation calculator 63 performs calculation of correlation between x(3) to x(10) and transmission codes $A(M)=\{a(M)_1, a(M)_2, \ldots, a(M)_L\}$ of the code length L and outputs AC(3, M) as a calculation result. That is, the correlation calculator 63 obtains outputs that are the same as those of a calculation result obtained for $a(M)_1=a(M)_2=, \ldots, =a(M)_6=0$. Thus, the correlation calculator 63 can obtain outputs that are the same as the outputs obtained by performing calculation of correlation between discrete samples x(k, M) and partial codes $A_{[7:8]}(M)=\{a(M)_7, a(M)_8\}$ obtained by extracting two codes from the tail end of the pulse compression codes A(M) of the code length L to be transmitted.

In FIG. 10(h), zero-padded outputs x(5) to x(8) and outputs x(9), x(10), x(11), and x(12) are input to the correlation calculator 63, and the correlation calculator 63 performs calculation of correlation between x(5) to x(12) and transmission codes $A(M)=\{a(M)_1, a(M)_2, \ldots, a(M)_L\}$ of the code length L and outputs AC(5, M) as a calculation result. That is, the correlation calculator 63 can obtain outputs that are the same as those of a calculation result obtained for $a(M)_1=a(M)_2=, \ldots, =a(M)_4=0$. Thus, the correlation calculator 63 can obtain outputs that are the same as outputs obtained by performing calculation of correlation between discrete samples x(k, M) and partial codes $A_{[5:8]}(M)=\{a(M)_5, a(M)_6, a(M)_7, a(M)_8\}$ obtained by extracting four codes from the tail end of the pulse compression codes A(M) of the code length L to be transmitted.

In FIG. 10(i), the outputs x(9) to x(16) are input to the correlation calculator 63, and the correlation calculator 63 performs calculation of correlation between x(9) to x(16) and transmission codes $A(M)=\{a(M)_1, a(M)_2, \ldots, a(M)_L\}$ of the code length L and outputs AC(9, M) as a calculation result. That is, the correlation calculator 63 outputs a result of the calculation of correlation between discrete samples x(k, M) and transmission codes of the code length L to be transmitted.

As described above, the calculation is performed on the correlation between the outputs AC(k, M) of the correlation calculator 63 in the time range of k=3, . . . , 8 and partial codes obtained by extracting two or more codes shorter than the code length L from the tail end of the pulse compression codes A(M) of the code length L to be transmitted. Thus, even when the input level of transmission leakage signals is high, and nonlinear distortion occurs in the A/D converters 37a and 37b, the outputs AC(k, M) of the correlation calculator 63 in the time range of k=3, . . . , 8 are not influenced by the nonlinear distortion components, thus making it possible to avoid influences of a significant increase in the range sidelobe level. Thus, the radar apparatus 60 can improve the performance of detecting a reflected wave from a low-RCS object.

FIG. 10(h) corresponds to a case of four codes, and FIG. 10(i) corresponds to a case of eight codes.

When a large-RCS object exists at a distance close to the radar apparatus 60, reception signal components in a reflected wave that the radar apparatus 60 receives from the large-RCS object are large. Consequently, when the amplitude of the reception baseband signals output from the reception wireless unit 32 exceeds the dynamic ranges of the A/D converters 37a and 37b, nonlinear distortion due to clipping occurs in the radar apparatus 60. Also, when an input to the LNA in the reception wireless unit 32 reaches an input level in the saturation region, nonlinear distortion occurs in the radar apparatus 60.

With respect to the discrete time k=τ at which a reflected wave from such a large-RCS object that causes nonlinear distortion components arrives, the zero-padding-timing controller 61 in the radar apparatus 60 sets, as a certain discrete sample range $[k_{min}, k_{max}]$, a discrete sample range $[\tau, \tau+Ns\times L]$ in which signals in a strong reflected wave that causes nonlinear distortion are received, and the zero padder 62 changes the discrete samples x(k, M) including signals of the strong reflected wave in which nonlinear distortion occurs to zeros. This makes it possible to obtain advantages that are the same as or similar to those of the processing for changing the multiplication coefficients in the correlation calculator 63 to zeros, and achieves processing that is equivalent to the correlation calculation using partial codes which is described above in the first embodiment. Thus, since the radar apparatus 60 is not influenced by nonlinear distortion components in the time range of the discrete time $[\tau, \tau+Ns\times L]$, it is possible to avoid influences of a significant increase in the range sidelobe level and it is possible to improve the performance of detecting a reflected wave from a low-RCS object.

As described above, according to the fourth embodiment, advantages that are the same as or similar to those described above in the first to third embodiments can be obtained without complicating the circuit configuration of a correlator for using partial codes.

Modification

Figure 11:
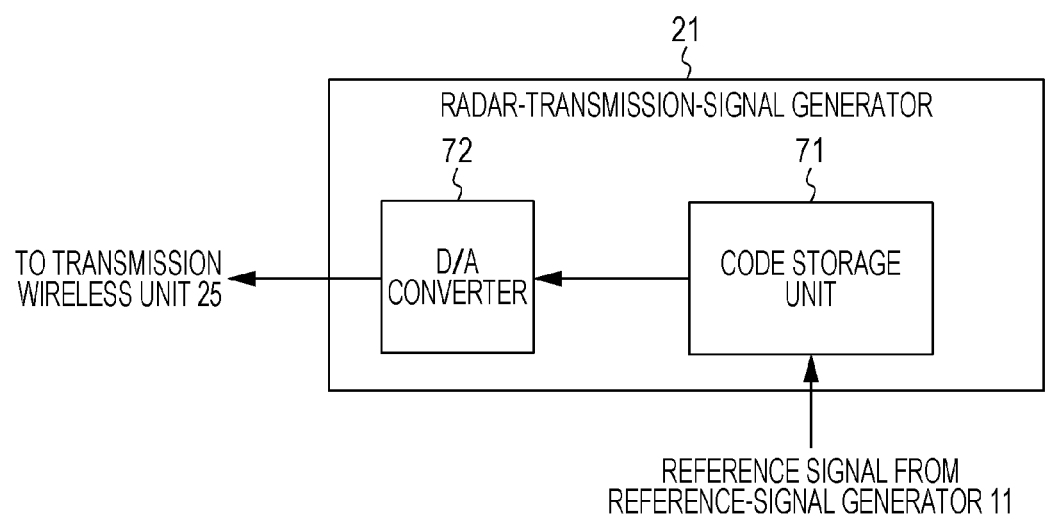
FIG. 11 is a block diagram illustrating the internal configuration of a radar-transmission-signal generator according to a modification of the present disclosure.

The radar-transmission-signal generator 21 is not limited to the configuration illustrated in FIG. 1 and may have a configuration illustrated in FIG. 11. The radar-transmission-signal generator 21 illustrated in FIG. 11 includes a code storage unit 71 and a D/A converter 72. The code storage unit 71 pre-stores a code sequence, reads the stored code sequence based on a reference signal output from the reference-signal generator 11, and outputs the read code sequence to the D/A converter 72.

The D/A converter 72 converts the digital signal, output from the code storage unit 71, into an analog baseband signal and outputs the analog baseband signal to the transmission wireless unit 25.

Aspects of the embodiments according to the present disclosure include the following aspects.

A radar apparatus according to a first disclosure includes: a transmitter which, in operation, transmits, as radar transmission signals, code sequences including a plurality of complementary codes having a code length L in each transmission period; a receiver which, in operation, receives one or more reflected waves including the radar transmission signals reflected by an object and are analog signals; an A/D converter which, in operation, converts the one or more reflected signals into digital signals, which are discrete samples; and a calculator which, in operation, performs a first calculation of correlation between the discrete samples and the code sequence transmitted by the transmitter and a second calculation of correlation between the discrete samples and a partial code sequence obtained by extracting a code length L−Q (L>Q≥2) from a tail end of the code sequence transmitted by the transmitter, and that outputs one of a result of the first correlation calculation and a result of the second correlation calculation.

A radar apparatus according to a second disclosure is the radar apparatus according to the first disclosure, the code sequence may include 2L complementary codes, and the transmitter may transmit the 2L complementary codes in a predetermined number of transmission periods.

A radar apparatus according to a third disclosure is the radar apparatus according to the first disclosure, and the code sequence may satisfy expressions (1) and (2):

$$RS_{S_1:S_2}(\tau, A(1), A(2L)) = \sum_{m=1}^{2L} \sum_{n=S_1}^{S_2} a(m)_{n+\tau} a(m)_n^* \quad (1)$$

$$\begin{cases} RS_{S_1:S_2}(\tau, A(1), A(2L)) \neq 0, & \text{when } \tau = 0 \\ RS_{S_1:S_2}(\tau, A(1), A(2L)) = 0, & \text{when } \tau \neq 0 \end{cases} \quad (2)$$

In this case, an m-th code sequence may be a code sequence A(m) having the code length L and is represented by $A(m)=\{a(m)_1, a(m)_2, \ldots, a(m)_L\}$, where $m=1, \ldots, 2L$, $S_2-S_1+1 \geq 2$, $L>S_2>S_1$, and $\tau$ represents a delay during the correlation calculation.

A radar apparatus according to a fourth disclosure is the radar apparatus according to the first disclosure, and the code sequence may be a Spano code sequence.

A radar apparatus according to a fifth disclosure is the radar apparatus according to the first disclosure, and the calculator includes: a first correlation calculator which, in operation, performs the first correlation calculation; a second correlation calculator which, in operation, performs the second correlation calculation; and a switch which, in operation, selects the result of the first correlation calculation from k to k+Q+1 on discrete times and selects the result of the second correlation calculation from k+Q+1 to L on the discrete times, k is an integer, when a timing at which the correlation calculator starts to performs the first correlation calculation is the discrete times k.

A radar apparatus according to a sixth disclosure is the radar apparatus according to the first disclosure, and the calculator includes a coefficient controller which, in operation, varies multiplication coefficients at respective discrete times k, k is an integer, the multiplication coefficients being used on correlation with the discrete samples converted by the A/D converter.

Although some embodiments have been described above with reference to the accompanying drawings, it goes without saying that the present disclosure is not limited to such examples. It is apparent to those skilled in the art that various changes and modifications can be conceived within the scope recited in the claims, and it is to be understood that such changes and modifications also naturally belong to the technical scope of the present disclosure. The constituent elements in each embodiment described above may also be combined together in a scope without departing from the subject matter of the present disclosure.

Although the description in each embodiment has been given of an example in which the present disclosure is realized using hardware, the present disclosure can also be realized by software in cooperation with hardware.

The functional blocks used in the description of each embodiment can typically be realized as a large-scale integrated (LSI) circuit having an input terminal and an output terminal. The functional blocks may be individually integrated into single chips or at least one or all of the functional constituent elements may be integrated into a single chip. Although the functional blocks are implemented in the form of an LSI in this case, they may also be called an integrated circuit (IC), a system LSI, a super LSI, or an ultra LSI depending on a difference in the degree of integration.

The scheme for integrating the functional blocks into an integrated circuit is not limited to a scheme for LSI and may be realized with a dedicated circuit or a general-purpose processor. The functional blocks can also be implemented using a field programmable gate array (FPGA) that can be programmed after manufacture of an LSI or a reconfigurable processor that allows reconfiguration of connections or settings of circuit cells in an LSI.

In addition, when a technology for circuit integration that replaces LSI becomes available with the advancement of semiconductor technology or another derivative technology, such a technology may also naturally be used to integrate the functional blocks. For example, biotechnology is applicable to the integration.

The radar apparatus according to the present disclosure can be applied to moving objects, including vehicles.

What is claimed is:

1. A radar apparatus comprising:
   a transmitter which, in operation, transmits, as radar transmission signals, code sequences including a plurality of complementary codes having a code length L in each transmission period;
   a receiver which, in operation, receives one or more reflected waves, which are analog signals, including the radar transmission signals reflected by an object;
   an analog-to-digital (A/D) converter which, in operation, converts the one or more reflected signals into digital signals, which are discrete samples; and
   a calculator which, in operation, performs a first calculation of correlation between the discrete samples and the code sequence transmitted by the transmitter and a second calculation of correlation between the discrete samples and a partial code sequence having a code length L−Q and obtained by extracting the last L−Q codes of the code sequence transmitted by the transmitter, the calculator, in operation, outputs, based on discrete times, one of a result of the first correlation calculation and a result of the second correlation calculation, wherein Q is an integer smaller than L and greater than or equal to two.

2. The radar apparatus according to claim 1,
   wherein the code sequence includes 2L complementary codes, and
   the transmitter transmits the 2L complementary codes in a predetermined number of transmission periods.

3. The radar apparatus according to claim 1,
   wherein the code sequence satisfies expressions (1) and (2):

$$RS_{S_1:S_2}(\tau, A(1), A(2L)) = \sum_{m=1}^{2L} \sum_{n=S_1}^{S_2} a(m)_{n+\tau} a(m)_n^* \quad (1)$$

$$\begin{cases} RS_{S_1:S_2}(\tau, A(1), A(2L)) \neq 0, & \text{when } \tau = 0 \\ RS_{S_1:S_2}(\tau, A(1), A(2L)) = 0, & \text{when } \tau \neq 0 \end{cases} \quad (2)$$

wherein an m-th code sequence is a code sequence A(m) having the code length L and is represented by A(m)= {a(m)$_1$, a(m)$_2$, ..., a(m)$_L$}, where m=1, ..., 2L, $S_2-S_1+1 \geq 2$, $L > S_2 > S_1$, and $\tau$ represents a delay during the correlation calculation, wherein m and n are integers, RS is a correlation result, $S_1$ is an integer, and $S_2$ is an integer greater than $S_1$.

4. The radar apparatus according to claim 1, wherein the code sequence is a Spano code sequence.

5. The radar apparatus according to claim 1, wherein the calculator comprises:
   a first correlation calculator which, in operation, performs the first correlation calculation;
   a second correlation calculator which, in operation, performs the second correlation calculation; and
   a switch which, in operation, selects the result of the second correlation calculation in the discrete time period of transmitting the code sequences and selects the result of the first correlation calculation in the discrete time period after transmitting the code sequences.

6. The radar apparatus according to claim 1, wherein the calculator comprises:
   a coefficient controller which, in operation, varies multiplication coefficients at respective discrete times k, k is an integer, the multiplication coefficients being used on correlation with the discrete samples converted by the A/D converter, wherein k is an integer, a reference point for the discrete times k being a start timing of a radar transmission period.

7. The radar apparatus according to claim 1, wherein the calculator comprises:
   a first correlation calculator which, in operation, performs a first correlation calculation;
   a second correlation calculator which, in operation, performs a second correlation calculation; and
   a switch which, in operation, selects, based on discrete times, one of a result of the first correlation calculation and a result of the second correlation calculation.

8. The radar apparatus according to claim 7, wherein a reference point for the discrete times is a start timing of a radar transmission period.

* * * * *